US012603906B2

(12) United States Patent
Gopalakrishna et al.

(10) Patent No.: US 12,603,906 B2
(45) Date of Patent: Apr. 14, 2026

(54) ALERT MONITORING OF DATA BASED ON RECOMMENDED ATTRIBUTE VALUES

(71) Applicant: StarTree, Inc., Mountain View, CA (US)

(72) Inventors: Kishore Gopalakrishna, Mountain View, CA (US); Madhumita Mantri, Sunnyvale, CA (US); Suvodeep Pyne, Sunnyvale, CA (US); Cyril De Catheu, Paris (FR)

(73) Assignee: StarTree, Inc., Mountain View, CA (US)

( * ) Notice: Subject to any disclaimer, the term of this patent is extended or adjusted under 35 U.S.C. 154(b) by 277 days.

(21) Appl. No.: 18/369,718

(22) Filed: Sep. 18, 2023

(65) Prior Publication Data

US 2024/0356947 A1 Oct. 24, 2024

Related U.S. Application Data

(60) Provisional application No. 63/461,573, filed on Apr. 24, 2023.

(51) Int. Cl.
H04L 9/40 (2022.01)

(52) U.S. Cl.
CPC ................................. H04L 63/1425 (2013.01)

(58) Field of Classification Search
CPC ....... H04L 43/04; H04L 41/069; H04L 41/22; H04L 41/5032; H04L 41/5009; H04L 43/08; H04L 63/145; H04L 63/1425; H04L 63/1416
See application file for complete search history.

(56) References Cited

U.S. PATENT DOCUMENTS

| | | | | |
|---|---|---|---|---|
| 2016/0173446 A1* | 6/2016 | Nantel | ................ | H04L 63/1425 726/11 |
| 2021/0390027 A1* | 12/2021 | Ohana | .................. | G06F 11/3055 |
| 2022/0286438 A1* | 9/2022 | Burke, Jr. | ........... | H04L 63/0407 |
| 2023/0147934 A1* | 5/2023 | Eddin | ................. | H04L 63/1416 705/64 |
| 2023/0344856 A1* | 10/2023 | Mosko | ................ | H04L 63/1425 |
| 2024/0039927 A1* | 2/2024 | Narayan | ............. | H04L 63/1416 |

* cited by examiner

*Primary Examiner* — Ryan J Jakovac
(74) *Attorney, Agent, or Firm* — Schwegman Lundberg & Woessner, P.A.

(57) ABSTRACT

Various embodiments described herein support or provide for alert monitoring of data (e.g., metric data) based on one or more recommended attribute values (e.g. dimension values), which can facilitate generation of alerts for the data based on detected anomalies. In particular, an embodiment can determine one or more recommended attribute values associated with data being analyzed for anomalies (e.g., metric data), select (or facilitate selection of) one or more of the recommended attribute values, configure alert monitoring for the data based on one or more selected attribute values, and enable the alert monitoring. Once enabled, the alert monitoring can trigger an alert in response to detecting one or more anomalies in the metric data associated with the one or more selected attribute values.

20 Claims, 15 Drawing Sheets

400

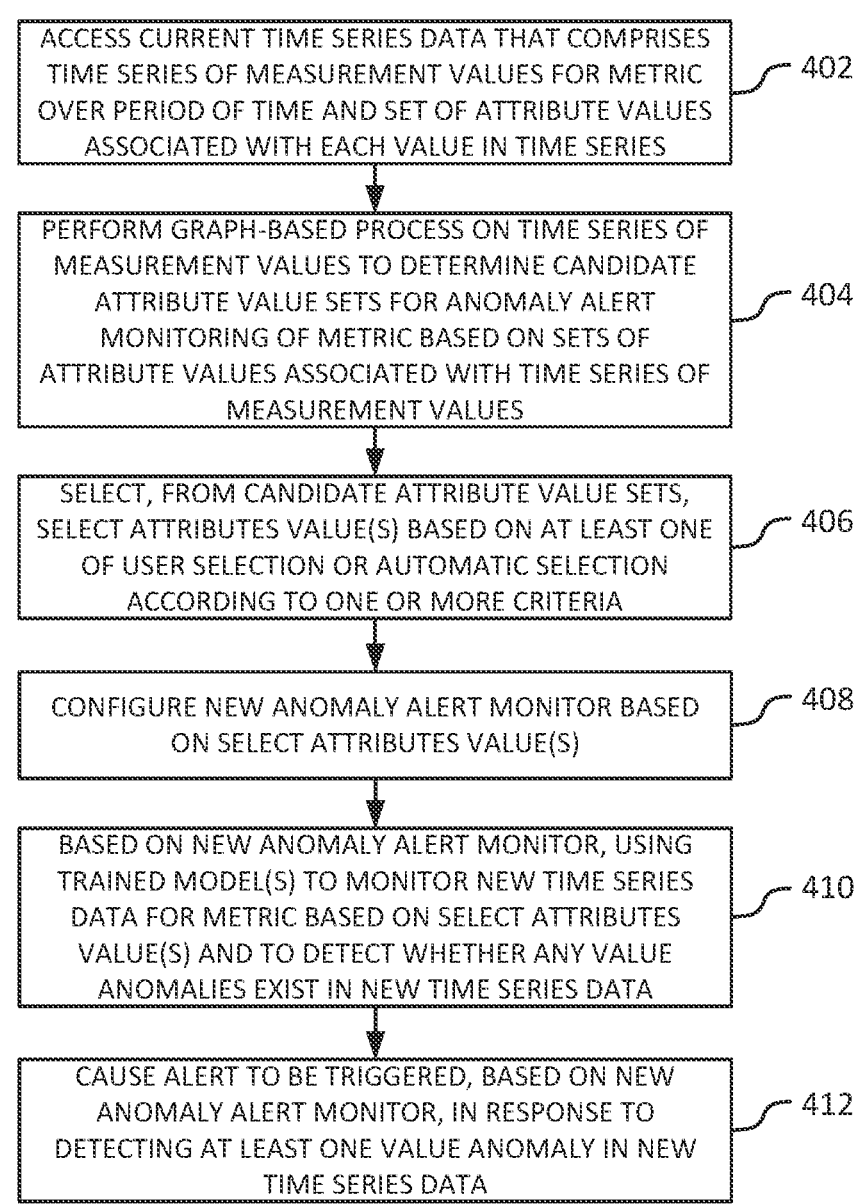

ACCESS CURRENT TIME SERIES DATA THAT COMPRISES TIME SERIES OF MEASUREMENT VALUES FOR METRIC OVER PERIOD OF TIME AND SET OF ATTRIBUTE VALUES ASSOCIATED WITH EACH VALUE IN TIME SERIES — 402

PERFORM GRAPH-BASED PROCESS ON TIME SERIES OF MEASUREMENT VALUES TO DETERMINE CANDIDATE ATTRIBUTE VALUE SETS FOR ANOMALY ALERT MONITORING OF METRIC BASED ON SETS OF ATTRIBUTE VALUES ASSOCIATED WITH TIME SERIES OF MEASUREMENT VALUES — 404

SELECT, FROM CANDIDATE ATTRIBUTE VALUE SETS, SELECT ATTRIBUTES VALUE(S) BASED ON AT LEAST ONE OF USER SELECTION OR AUTOMATIC SELECTION ACCORDING TO ONE OR MORE CRITERIA — 406

CONFIGURE NEW ANOMALY ALERT MONITOR BASED ON SELECT ATTRIBUTES VALUE(S) — 408

BASED ON NEW ANOMALY ALERT MONITOR, USING TRAINED MODEL(S) TO MONITOR NEW TIME SERIES DATA FOR METRIC BASED ON SELECT ATTRIBUTES VALUE(S) AND TO DETECT WHETHER ANY VALUE ANOMALIES EXIST IN NEW TIME SERIES DATA — 410

CAUSE ALERT TO BE TRIGGERED, BASED ON NEW ANOMALY ALERT MONITOR, IN RESPONSE TO DETECTING AT LEAST ONE VALUE ANOMALY IN NEW TIME SERIES DATA — 412

FIG. 4

Dimensions and outliers Results
Select the dimensions and create a multi-dimension alert

| Name | Individual contribution | Total impact (weighted score) |
|---|---|---|
| country='US' AND device='phone' | 1.01k | 288.59% |
| country='IN' AND device='phone' | 880.02 | 252.5% |
| device='phone' | 627.72 | 180.11% |
| country='US' AND device='desktop' | 586.52 | 168.29% |
| country='US' | 558.57 | 160.26% |
| country='IN' AND device='desktop' | 513.14 | 147.23% |
| country='BR' AND device='phone' | 499.76 | 143.39% |
| country='IN' | 488.68 | 140.21% |
| device='desktop' | 365.97 | 105.01% |
| country='BR' AND device='desktop' | 291.34 | 83.59% |
| country='BR' | 277.44 | 79.6% |
| country='CA' AND device='phone' | 125.29 | 35.95% |
| country='US' AND device='tablet' | 83.38 | 23.92% |

900

902   904   906   908   CREATE MULTI-DIMENSION ALERT

FIG. 9

ALERT MONITORING OF DATA BASED ON RECOMMENDED ATTRIBUTE VALUES

CROSS-REFERENCE TO RELATED APPLICATION

This application claims priority to and the benefit of U.S. Provisional Patent Application No. 63/461,573, filed on Apr. 24, 2023, which is incorporated herein by reference.

TECHNICAL FIELD

The present disclosure relates generally to media assets, and, more particularly, various embodiments described herein provide for systems, methods, techniques, instruction sequences, and devices for alert monitoring of data (e.g., metric data) based on one or more recommended attribute values (e.g., dimension values).

BACKGROUND

Certain analytics systems can be used to analyze data (e.g., time series log data) generated by other systems, such as web servers or video conferencing platforms, and identify operational anomalies that pose an actual or potential issue (e.g., performance, security, or reliability issue) for those systems. In such contexts, the analytics system can be configured to ingest data (e.g., log data), configured to detect various anomalies, and configured to issue alerts (e.g., to a systems administrator) regarding detected anomalies. To detect anomalies, the analytics system can use a model, such as a machine learning model or a statistical model, to generate forecasted or predicted data over a time period (e.g., forecasted/predicted timeseries data), can determine whether the expected/predicted data deviates or diverges from the ingested data (e.g., observed data) over the same time period, and can determine when the deviation/divergence is sufficient to constitute an anomaly.

BRIEF DESCRIPTION OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings.

FIG. 4 is a flowchart illustrating an example method for alert monitoring of metric data based on one or more recommended attribute values, according to various embodiments of the present disclosure.

FIGS. 7 through 13 illustrate example graphical user interfaces (GUIs) for alert monitoring of metric data based on one or more recommended attribute values, according to various embodiments of the present disclosure.

DETAILED DESCRIPTION

Figure 1:
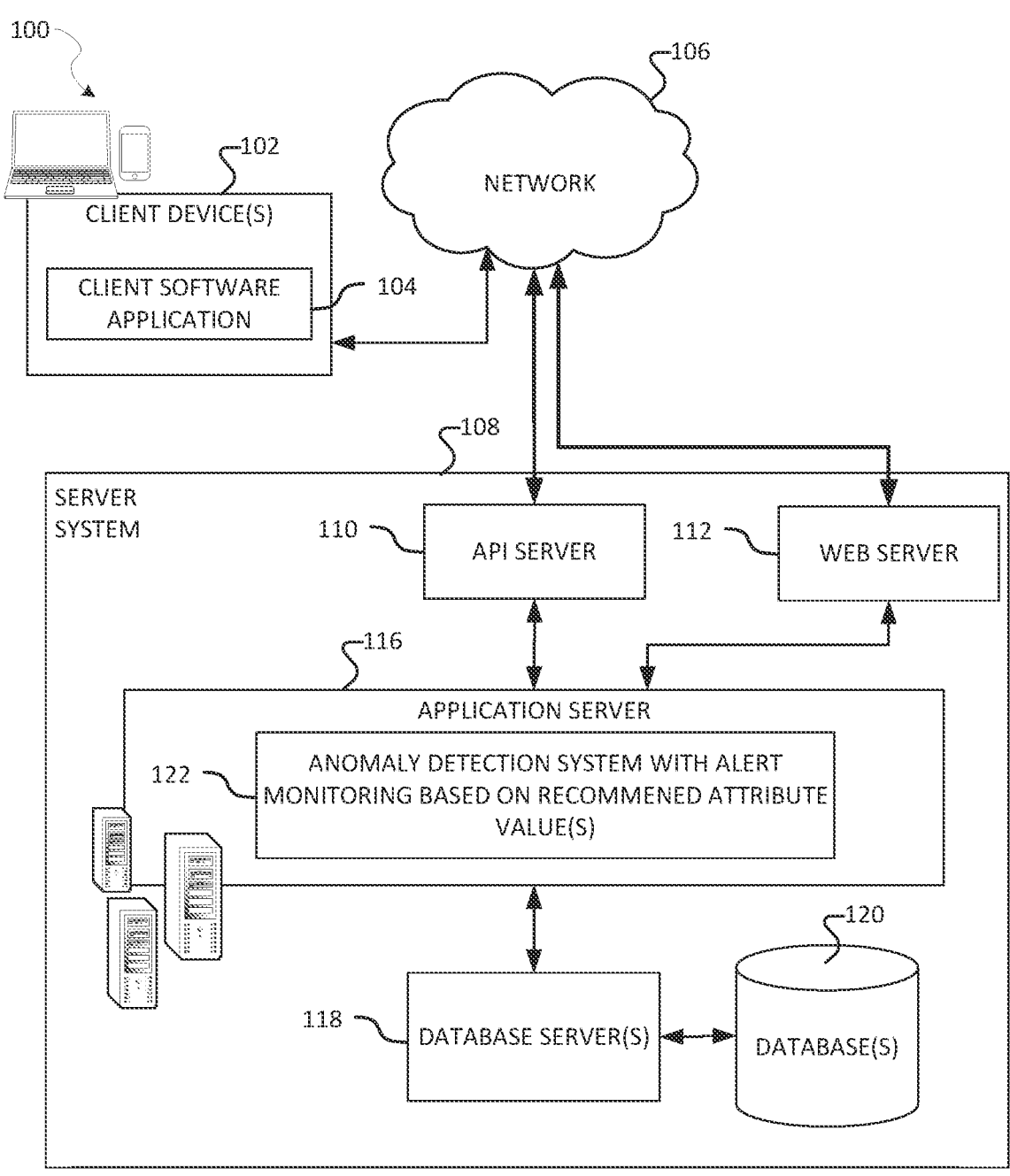
FIG. 1 is a block diagram showing an example data system that includes an anomaly detection system with alert monitoring based on one or more recommended attribute values, according to various embodiments of the present disclosure.

At present, setting up monitoring for alerts can involve a user reviewing anomalies detected by the analytics system (e.g., detected recently and the in the past, which can be quite large for a massive dataset), the user identifying which of those anomalies would best benefit from alerts (e.g., identifying anomalies that have the most impact on a monitored system), and the user then setting up alert monitoring for those identified anomalies. Unfortunately, reviewing and identifying anomalies of interest can be a challenging, time-consuming, and tedious task for a user to perform, especially when the data being monitored for anomalies is a massive data set. For instance, where a user wishes to detect anomalies within a massive data set comprising a time series of values each having attribute values (e.g., dimension values), it can be challenging for the user to determine which attribute values should be used to filter and monitor the time series for anomaly detection.

Various embodiments described herein cure these and other deficiencies present in conventional art by providing for alert monitoring of data (e.g., metric data) based on one or more recommended attribute values (e.g., dimension values), which can facilitate generation of alerts for the data based on detected anomalies. In particular, an embodiment can determine one or more recommended attribute values (e.g., operating system type 1, operating system type 2, country 1, country 2, country 3, cell phone carrier 1, cell phone carrier 2, etc.) associated with data being analyzed for anomalies (e.g., metric data, such as page views of a website, session time, latency, user requests, or the like), select (or facilitate selection of) one or more of the recommended attribute values, configure alert monitoring for the data based on one or more selected attribute values, and enable the alert monitoring. Once enabled, the alert monitoring can trigger an alert in response to detecting one or more anomalies in the metric data associated with the one or more selected attribute values. For some embodiments, values in data (e.g., metric data) being analyzed for anomalies are aggregated to detect one or more value anomalies in the metric data. For instance, with respect to data (e.g., time series data) that comprises a series of measurement values over a range of time, the measurement values can be aggregated using at least one of several different aggregation functions, such as a summation (SUM) function, an average (AVG) function, a count function, a maximum (MAX) function, a minimum (MIN) function, or a median (MED) function.

Depending on the embodiment, the recommendation of attribute values for alert monitoring can be generated automatically (e.g., via a periodic process) or at the request of a user. For instance, an embodiment can automatically recommend one or more attributes values (as described herein), can automatically select one or more of the one or more recommended attributes values associated with respect to metric data, and can automatically configure alert monitoring on the metric data (e.g., which may be updated in real-time), which can comprise a time series of values for a metric. In another instance, an embodiment can present one or more user interfaces (e.g., one or more graphical user interfaces (GUIs)) to enable a user to review one or more recommended attributes values (e.g., determined using weight-based scores) associated with the metric data, enable the user to review a preview of anomalies detected according to one or more of the recommended attributes values, and to select one or more of the recommended attributes values to configure an alert monitor for the metric data.

As used herein, a metric can refer to a measurable parameter of a system, such as user visits to the system (e.g., new user visits, existing user visits), user requests from the system (e.g., page view requests), user submissions to the system (e.g., user intake requests, user uploads, or user postings), user session times with the system, and other user-related metrics relating to a system. In other instances, a metric can refer to a measurable parameter not relating to a system, such as revenue, customer visits, sales, orders, number of items sold, inventory numbers, and the like. A metric can be measured over a period of time (e.g., range of time) by taking, observing, or determining a series of measurement values of the metric at a series of time instances (e.g., series of timestamps). Various embodiments described herein use data that comprises time series data for a metric, which describes a time series of measurement values of the metric. As used herein, data being monitored for alerts can be updated periodically or in real-time. For various embodiments, time series data being monitored for anomalies is generated by a system or a device that is being monitored for anomalies (e.g., anomalies relating to performance issues, suspicious or unauthorized activities, and the like by the system or the device). Herein, an attribute can also be referred to as a dimension. The one or more recommended attribute values can be regarded as a cohort of attribute values. As used herein, a time series can comprise a series (e.g., collection) of values (e.g., measurement values) observed for a metric (e.g., measurements of the metric made sequentially in time). Each individual value (e.g., data point) in a time series can have one or more attribute values (e.g., dimension values) associated with the individual value. As used herein, an attribute can be assigned an attribute value.

Use of various embodiments can enable determination (e.g., identification) of one or more recommended attribute values for monitoring metric data, exploration of the one or more recommended attribute values (e.g., exploration to facilitate selection of less than all of the recommended attribute values), configuration of alert monitoring for the metric data based on one or more recommended attribute values (e.g., based on only those recommended attribute values selected during exploration), or can enable alert monitoring for the metric data based on one or more recommended attribute values. Additionally, for purposes of configuring alert monitoring, use of various embodiments can assist a user in exploring and identifying one or more attribute values that focus on potential issues or risks (e.g., focus on data anomalies that indicate issues or risks) present in massive data sets (e.g., massive metric data sets that comprise time series of values for a metric being monitored). When exploring one or more recommended attribute values (e.g., for selection purposes), an embodiment can enable a user to filter the one or more recommended attribute values, such as according to a time window (e.g., only recommend attributes values based on time series data that falls within a (date range), one or more threshold values (e.g., absolute or percentage values to be applied to a count of measurement values), a database statement (e.g., a search query language (SQL) statement that includes WHEREIN or HAVING clauses), search depth (e.g., where a graph or tree-based process as described herein can be used to determine recommended attribute values), or ranking (e.g., N number of recommended attribute value sets having the highest associated weights).

Various embodiments provide for a technical solution for alert monitoring for time series anomaly detection. For instance, various embodiments provide a technical solution for improving configuration of alert monitoring (for time series anomaly detection) based on one or more attribute values. Various embodiments provide for a technical solution for improving the process by which one or more different configurations for alert monitoring (for time series anomaly detection) based on one or more attribute values are explored or previewed. By providing improved alert monitoring configurations, various embodiments provide a technical solution for setting up one or more focused alert monitors (e.g., better focused on alerting a user to potential issues or risks). Additionally, various embodiments provide a technical solution for automatically setting up alert monitoring for time series anomaly detection.

Reference will now be made in detail to embodiments of the present disclosure, examples of which are illustrated in the appended drawings. The present disclosure may, however, be embodied in many different forms and should not be construed as being limited to the embodiments set forth herein.

FIG. 1 is a block diagram showing an example data system 100 that includes an anomaly detection system with alert monitoring based on one or more recommended attribute values 122 (hereafter, the anomaly detection system 122), according to various embodiments of the present disclosure. By including the anomaly detection system 122, the data system 100 can determine (e.g., identify) one or more recommended attribute values for alert monitoring of data (e.g., metric data), explore the one or more recommended attribute values, select the one or more recommended attribute values, configure alert monitoring based on one or more selected recommended attribute values, enable the alert monitoring, or some combination thereof as described herein. In particular, a user at the client device 102 can access the anomaly detection system 122 (e.g., via a graphical user interface presented on a software application on the client device 102) and use the anomaly detection system 122 to facilitate or cause one or more of the determination of the one or more recommended attribute values, the exploration of the one or more recommended attribute values, the selection of the one or more recommended attribute values, the configuration of alert monitoring based on one or more selected recommended attribute values, the enablement of the alert monitoring, or some combination thereof.

As shown, the data system 100 includes one or more client devices 102, a server system 108, and a network 106 (e.g., including Internet, wide-area-network (WAN), local-area-network (LAN), wireless network, etc.) that communicatively couples them together. Each client device 102 can host a number of applications, including a client software application 104. The client software application 104 can communicate data with the server system 108 via a network 106. Accordingly, the client software application 104 can communicate and exchange data with the server system 108 via the network 106.

The server system 108 provides server-side functionality via the network 106 to the client software application 104. While certain functions of the data system 100 are described herein as being performed by the anomaly detection system 122 on the server system 108, it will be appreciated that the location of certain functionality within the server system 108 is a design choice. For example, it may be technically preferable to initially deploy certain technology and functionality within the server system 108, but to later migrate this technology and functionality to the client software application 104 where the client device 102 performs methodologies described herein.

The server system 108 supports various services and operations that are provided to the client software application 104 by the anomaly detection system 122. Such operations include transmitting data from the anomaly detection system 122 to the client software application 104, receiving data from the client software application 104 to the anomaly detection system 122, and the anomaly detection system 122 processing data generated by the client software application 104. This data may include for example, requests and responses relating to alert monitoring, which can include requests/responses relating to: determination of one or more recommended attribute values for alert monitoring of data (e.g., metric data) being analyzed for anomalies; exploration of one or more recommended attribute values for alert monitoring of data being analyzed for anomalies; configuration of alert monitoring of data (being analyzed for anomalies) based on one or more recommended attribute values; or enabling of alert monitoring for the metric data based on one or more recommended attribute values. Data exchanges within the data system 100 may be invoked and controlled through operations of software component environments available via one or more endpoints, or functions available via one or more user interfaces of the client software application 104, which may include web-based user interfaces provided by the server system 108 for presentation at the client device 102.

With respect to the server system 108, each of an Application Program Interface (API) server 110 and a web server 112 is coupled to an application server 116, which hosts the anomaly detection system 122. The application server 116 is communicatively coupled to a database server 118, which facilitates access to a database 120 that stores data associated with the application server 116, including data that may be generated or used by the anomaly detection system 122.

The API server 110 receives and transmits data (e.g., API calls, commands, requests, responses, and authentication data) between the client device 102 and the application server 116. Specifically, the API server 110 provides a set of interfaces (e.g., routines and protocols) that can be called or queried by the client software application 104 in order to invoke functionality of the application server 116. The AI server 110 exposes various functions supported by the application server 116 including, without limitation: user registration; login functionality; data object operations (e.g., generating, storing, retrieving, encrypting, decrypting, transferring, access rights, licensing, etc.); and user communications.

Through one or more web-based interfaces (e.g., web-based user interfaces), the web server 112 can support various functionality of the anomaly detection system 122 of the application server 116. The application server 116 hosts a number of applications and subsystems, including the anomaly detection system 122, which supports various functions and services with respect to various embodiments described herein.

The application server 116 is communicatively coupled to a database server 118, which facilitates access to database(s) 120 in which may be stored data associated with the anomaly detection system 122. Data associated with the anomaly detection system 122 can include, for example, data that comprises a time series of measurement values for a metric, and a set of attribute values associated with each of the measurement values in the time series.

Figure 2:
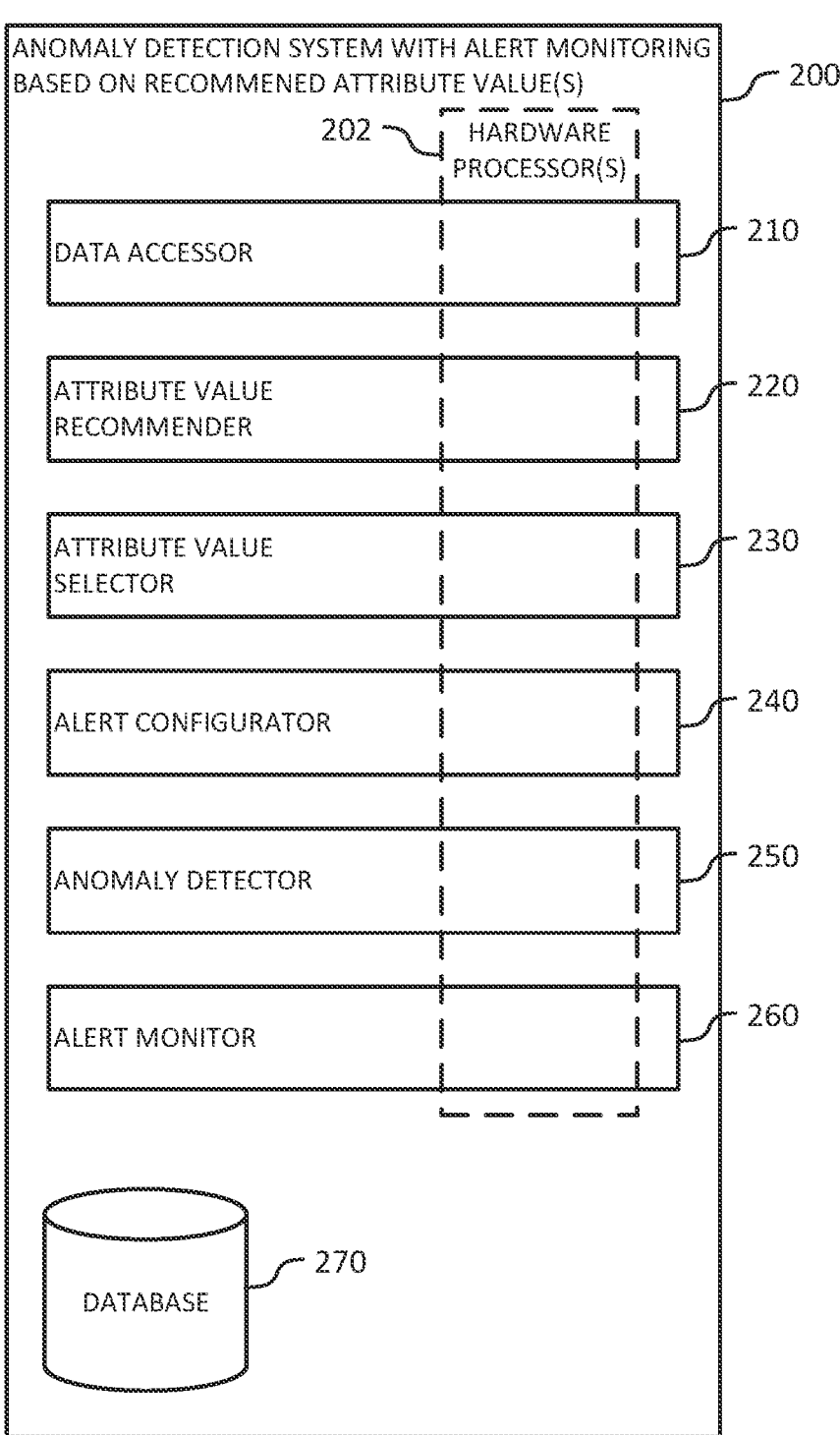
FIG. 2 is a block diagram illustrating an example anomaly detection system, according to various embodiments of the present disclosure.

FIG. 2 is a block diagram illustrating an example anomaly detection system with alert monitoring based on one or more recommended attribute values 200 (hereafter, the anomaly detection system 200), according to various embodiments of the present disclosure. For some embodiments, the anomaly detection system 200 represents an example of the anomaly detection system 122 described with respect to FIG. 1. As shown, the anomaly detection system 200 comprises a data accessor 210, an attribute value recommender 220, an attribute value selector 230, an alert configurator 240, an anomaly detector 250, an alert monitor 260, and a database 270. According to various embodiments, one or more of the data accessor 210, the attribute value recommender 220, the attribute value selector 230, the alert configurator 240, the anomaly detector 250, and the alert monitor 260 are implemented by one or more hardware processors 202. Data (e.g., alert monitor configuration information, information regarding detected anomalies, etc.) generated by, or used by, one or more of the data accessor 210, the attribute value recommender 220, the attribute value selector 230, the alert configurator 240, the anomaly detector 250, and the alert monitor 260 is stored on the database (or datastore) 270 of anomaly detection system 200.

The data accessor 210 is configured to facilitate access of time series data that comprises a time series of measurement values for a metric, such as user page views, user session time, system latency, user requests, or another measurement, over a period of time (e.g., range of dates, range of times, or both). The metric can relate to measuring a user interaction or activity with respect to another system (e.g., third-party system) that is targeted for monitoring and analysis. For some embodiments, the time series data being accessed is one being monitored and analyzed (e.g., in real-time or periodically) for anomaly detection. The time series data can be generated by another system (e.g., a third-party system) that is targeted for monitoring and analysis. For some embodiments, a data source provides event data, and at least some portion of the event data is transformed into time series data. Depending on the embodiment, the portion of event data can be transformed using an aggregation function (such as summation function or average function, which can be selected by a user), can be performed at a specific granularity (which can be specified by a user), and can be performed while applying attribute filters (which can be specified by a user). Additionally, for some embodiments, the time series further comprises a set of attribute values associated with each measurement value (e.g., text value, numeric value, or alphanumeric value) in the time series, such as a value describing an operating system type, a mobile device type, an Internet service provider (ISP), a country, a region, a state, or any other value associated with (e.g., describing a circumstance associated with) a measurement value in the time series.

The attribute value recommender 220 is configured to facilitate performance of a graph-based process on time series of measurement values (accessed via the data accessor 210), where the graph-based process determines a plurality of candidate attribute value sets for anomaly alert monitoring of the metric based on sets of attribute values (included in the time series) associated with the time series of measurement values. In doing so, the metric can be monitored per time slice according to select attribute values. Each candidate attribute value set can comprise a set of attribute values, which can be considered/regarded as a recommendation of one or more attribute values for alert monitoring. Accordingly, each candidate attribute value set can represent a different combination of attribute values that is being recommended and possibly used to configure an alert monitor as described herein. The attribute value recommender 220 can enable a user to explore and consider recommended attribute values (e.g., dimension values) for alert monitoring of the time series data. For instance, after a plurality of candidate attribute value sets, a user can preview (e.g., based on past time series data) what or how many anomalies are detected by monitoring the time series data based on (e.g., in view of) one of the candidate attribute value sets. For various embodiments, the graph-based process determines a score or a weight for each candidate attribute value set in the plurality, which can assist in comparison and selection of candidate attribute value sets in subsequent steps. For instance, the score or the weight of a given candidate attribute value set can indicate how much of all measurement values in the time series the given candidate attribute value set represents.

The attribute value selector 230 is configured to facilitate selection, from the plurality of candidate attribute value sets (determined by the attribute value recommender 220), a set of select attributes values based on at least one of user selection or automatic selection according to a set of criteria. For various embodiments, the set of attribute values comprises (e.g., combines) attribute values from each of the candidate attribute value sets selected (by the attribute value selector 230). For instance, if a user (e.g., via a GUI) selects only a first candidate attribute value set of the plurality of candidate attribute value sets, then the set of select attributes values comprises all attribute values from the first candidate attribute value set. If the user selects a first candidate attribute value set and a second candidate attribute value set of the plurality of candidate attribute value sets, then the set of select attributes values comprises all attribute values from both the first and the second candidate attribute value sets.

The alert configurator 240 is configured to facilitate configuration of a new anomaly alert monitor based on the set of select attribute values (as determined by the attribute value selector 230). For various embodiments, the anomaly alert monitor is configured to monitor the time series data for anomaly (e.g., value anomaly) detection based on measurement values in the time series that are associated with (e.g., that have matching attribute values) the set of select attributes values (e.g., determine whether there is a value anomaly within the measurement value in the time series that are associated with the set of select attributes values). Once configured by the alert configurator 240, an alert monitor (e.g. configuration information for the alert monitor) can be stored on the anomaly detection system 200 (e.g., on the database 270), and can be enabled or disabled (e.g., by a user) as desired.

The anomaly detector 250 is configured to facilitate use of a set of trained models to monitor new time series data (e.g., new measurement values added to the time series) for the metric based on one or more select attributes values, and to detect whether any value anomalies exist in the new time series data (e.g., in the new measurement values). In this way, the set of trained models can be used to identify value anomalies (e.g., outliers) in time slices in the time series of measurement values.

In particular, for some embodiments, the set of trained models is used to determine (e.g., generate) predicted or expected values at certain time points in a time series, the predicted/expected values are compared against the actual or observed values at those certain times in the time series, and the actual/observed values can be determined to be anomalies based on the comparison (e.g., if the deviation between the predicted/expected values and the actual/observed values surpasses a certain threshold to indicate that the predicted/expected values are detected anomalies). Depending on the embodiment, each model in the set of trained models can comprise a statistical model or a machine learning (ML) model, and each model can be trained in detection of anomaly (e.g., an anomalous value) in a time series of values (e.g., measurement values). The training can involve training a given model based on training data that includes historical time series data, which can comprise a time series of measurement values observed in the past. Additionally, one or more models in the set of trained models can detect anomalies (e.g., value anomalies) based on a sensitivity value (e.g., having a value that can range from low sensitivity to high sensitivity).

For various embodiments, to detect whether any value anomalies exist in the new time series data based on one or more select attributes values specified by an alert monitoring, measurement values in the new time series data associated with an individual set of attribute values are aggregated (e.g., by an aggregation function, such as a SUM function, an AVG function, a count function, a MAX function, a MIN function, or a MED function) to detect one or more value anomalies in the new time series data using the set of trained models. Accordingly, for some embodiments, the set of trained models is used to monitor new time series data for the metric based on one or more select attributes values, aggregating measurement values in the new time series data using a select aggregation function (e.g., user-selected aggregation function), and to detect whether any value anomalies exist in the new time series data using the set of trained models. Depending on the embodiment, a user can select an aggregation function to be used by the alert monitoring for detecting value anomalies.

The alert monitor 260 is configured to facilitate causing an alert to be triggered, based on the new anomaly alert monitor, in response to detecting at least one value anomaly in the new time series data (by the anomaly detector 250). For various embodiments, once the new anomaly alert monitor is enabled, the anomaly detector 250 is used to monitor the time series data for anomalies (e.g., value anomalies) in new measurement values of the time series that are associated with (e.g., new measurement values that have matching attribute values to) the set of select attributes values specified by the new anomaly alert monitor.

Figure 3:
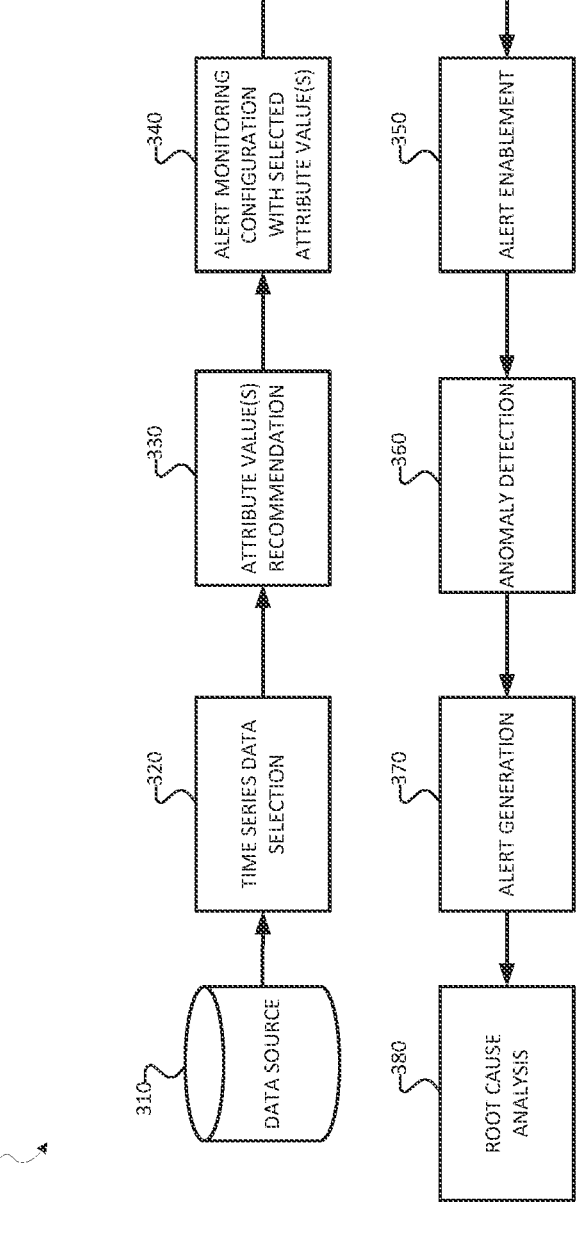
FIG. 3 is a flowchart illustrating an example workflow for configuring, enabling, and generating an alert on an anomaly detection system for detecting anomaly in time series data for a metric, according to various embodiments of the present disclosure.

FIG. 3 is a flowchart illustrating data flow within an example workflow 300 for configuring, enabling, and generating an alert on an anomaly detection system for detecting anomaly in time series data for a metric, according to various embodiments of the present disclosure. In particular, the workflow 300 illustrates how a user can interact with the anomaly detection system 122 to configure and enable alert monitoring for the metric on the anomaly detection system 122, and how the anomaly detection system 122 can generate an alert based on the alert monitoring. For some embodiments, one or more of the steps illustrated in the workflow 300 can be automatically performed (e.g., as part of background process or a process that is automatically performed periodically) or by way of an input or a request from a user (e.g., via a GUI presented on a web-based portal).

At step 320, a user (or a process) can select one time series (of measurement values) from those available (e.g., stored) on a data source 310 (e.g., the database 120), where each available time series can provide measurement values for a different metric. For some embodiments, the data source 310 provides event data, and at least some portion of the event data is transformed into time series data (e.g., in real-time), which provides the selected time series of measurement values. The transformation of the portion of the event data to time series data can occur prior to the user selecting the one timer series at step 320, or can occur in real time after the user selects the one timer series at step 320. Depending on the embodiment, the portion of event data can be transformed using an aggregation function (such as summation function or average function, which can be selected by a user), can be performed at a specific granularity (which can be specified by a user), and can be performed while applying attribute filters (which can be specified by a user).

Based on one or more attribute values present in the selected time series, at operation 330, one or more attribute value sets (e.g., one or more candidate attribute value sets) can be determined and recommended to a user for alert monitoring (e.g. presented in a GUI). Each attribute value set recommended can represent a cohort of attribute values being recommended for monitoring. A user can choose to preview detection of anomalies in the selected time series based on one or more (e.g., for each) of the recommended attribute value sets.

After a user reviews and selects one or more of the recommended attribute value sets for alert monitoring, at step 340 the alert monitoring is configured with the resulting set of selected attribute values, and the configuration for the alert monitoring is saved. For some embodiments, the set of selected attribute values used to configure the alert monitoring comprises attributes values from each of the recommended attribute value sets selected by the user for the alert monitoring.

Once the alert monitoring is configured, at operation 350 the alert monitoring is enabled (e.g., based on user input or user request) and, at operation 360, detection of anomalies is performed (e.g., periodically or in real-time) on the selected time series based on the set of attribute values of the enabled alert monitoring. In particular, data fetches can fetch data (e.g., new data) from the selected time series (and can do so based on the set of attribute values) and an anomaly detector (e.g., anomaly detector 250) can use a set of trained models to detect for any anomalies (e.g., value outliers) in the selected time series. In the event that an anomaly is detected based on the enabled alert monitoring, at operation 370 an alert is generated (or triggered). Depending on the embodiment, the alert can be generated and delivered for a user's review via a GUI on a web-based portal or a dedicated software application (e.g., mobile device application), or via a message to the user (e.g., e-mail or text message). The type of alert (e.g., audio, visual, etc.) generated and method of delivery can vary. Based on a generated alert, at operation 380 the user can perform a root cause analysis of the alert, and review (e.g., analyze) details associated with the generated alert (e.g., investigate the one or more detected anomalies in the selected time series that resulted in the generation of the alert).

FIG. 4 is a flowchart illustrating an example method 400 for alert monitoring of metric data based on one or more recommended attribute values, according to various embodiments of the present disclosure. It will be understood that example methods described herein may be performed by a machine in accordance with some embodiments. For example, the method 400 can be performed by the anomaly detection system 122 described with respect to FIG. 1, the anomaly detection system 200 described with respect to FIG. 2, or individual components thereof. An operation of various methods described herein may be performed by one or more hardware processors (e.g., central processing units or graphics processing units) of a computing device (e.g., a desktop, server, laptop, mobile phone, tablet, etc.), which may be part of a computing system based on a cloud architecture. Example methods described herein may also be implemented in the form of executable instructions stored on a machine-readable medium or in the form of electronic circuitry. For instance, the operations of the method 400 may be represented by executable instructions that, when executed by a processor of a computing device, cause the computing device to perform the method 400. Depending on the embodiment, an operation of an example method described herein may be repeated in different ways or involve intervening operations not shown. Though the operations of example methods may be depicted and described in a certain order, the order in which the operations are performed may vary among embodiments, including performing certain operations in parallel.

At operation 402, current time series data is accessed (e.g., from one of the databases 120) by a hardware processor, where the current time series data comprises a time series of measurement values for a metric (e.g., page views of a website) over a period of time, and where the time series comprises a set of attribute values (e.g., for a country attribute, a city attribute, an ISP attribute, a device type attribute, a user gender attribute, an operating system attribute, and the like) associated with each measurement value in the time series. For various embodiments, each measurement value in the time series represents a data point in the time series. Additionally, for some metrics, each measurement value in the time series can be regarded as a count for the metric. For instance, where the metric is page views (or a similar metric), each data point in the time series (e.g., each measurement value) can represent one page view. For some embodiments, the time series data is generated from event data, where at least some portion of event data is transformed into the time series data. Depending on the embodiment, the portion of event data can be transformed using an aggregation function (such as summation function or average function, which can be selected by a user), can be performed at a specific granularity (which can be specified by a user), and can be performed while applying attribute filters (which can be specified by a user).

At operation 404, a graph-based process on the time series of measurement values is performed, by the hardware processor, to determine a plurality of candidate attribute value sets for anomaly alert monitoring of the metric based on sets of attribute values associated with the time series of measurement values (e.g., each measurement value having its own respective set of attribute values). For some embodiments, operation 404 comprises generating a graph comprising nodes and weighted connections, and traversing (e.g., searching) the graph to determine the plurality of candidate attribute value sets, where the graph is generated using a total count (e.g., total cardinality) of measurement values in the time series and using individual counts (e.g., individual cardinalities) of measurement values in different portions of the time series associated with different attribute value sets. For some embodiments, operation 404 comprises generating a tree (e.g., unidirected graph) comprising a root node associated with all measurement values in the time series, a plurality of children nodes where each child node of the plurality of children nodes is associated with a different attribute value set, and a plurality of connections where each connection of the plurality of connections from a parent node to a child node is associated with a weight determined based on an individual count of measurement values in a portion of the time series that is associated with an individual attribute value set associated with the child node.

Traversing the graph to determine the plurality of candidate attribute value sets can comprise determining an associated weight for each of the plurality of candidate attribute value sets, where the associated weight of an individual candidate attribute value set is determined based on one or more of the weighted connections of the graph. An individual weight of an individual weighted connection from a first node to a second node can be determined based on the total count of measurement values and an individual count of measurement values in a portion of the time series that is associated with an individual attribute value set of the different attribute value sets, where the second node is associated with the individual attribute value set.

For various embodiments, the graph-based process is configured to determine the plurality of candidate attribute value sets based on one or more different parameters. For instance, performing the graph-based process on the time series of measurement values to determine the plurality of candidate attribute value sets can be further based on one or more of the following: a time window (e.g., a time or date range); a search depth within the generated graph; a threshold value (e.g., weight or score threshold value); a database filter (e.g., using WHEREIN or HAVING clauses of a SQL statement); a select set of attributes (e.g., attributes specifically selected by a user); or a predetermined number of nodes having the highest weight/score (e.g., top N nodes of the graph).

At operation 406, the hardware processor selects a set of select attribute values from the plurality of candidate attribute value sets based on at least one of user selection or automatic selection according to a set of criteria. For instance, operation 406 can comprise obtaining the user selection by causing at least a portion of the plurality of candidate attribute value sets to be presented on one or more displays (e.g., on a GUI). For example, each candidate attribute value set can be presented with a weight (or score) associated with the candidate attribute value set. For various embodiments, a weight or score of a candidate attribute value set represents a percentage of measurement values in the time series associated with the candidate attribute values. The set of criteria can include, for example, a weight threshold value, a minimum number of attribute value sets to be selected, a maximum number of attribute value sets to be selected, and the like.

At operation 408, the new anomaly alert monitor is configured by the hardware processor based on the set of select attribute values (selected by operation 406). Based on the new anomaly alert monitor configured at operation 408, at operation 410, a set of trained models is used by the hardware processor to monitor new time series data for the metric based on the set of select attributes values (associated with the new anomaly alert monitor), and to detect whether any value anomalies exist in the new time series data According to various embodiments described herein, during operation 410 the hardware processor detects whether any value anomalies exist in the new time series data based on the set of select attributes values (associated with the new anomaly alert monitor) by aggregating (e.g., by an aggregation function, such as a SUM function, an AVG function, a count function, a MAX function, a MIN function, or a MED function) measurement values in the new time series data associated with the set of select attributes values to detect one or more value anomalies in the new time series data using the set of trained models. At operation 412, the hardware processor causes an alert to be triggered in response to detecting (using the set of trained models) at least one value anomaly in the new time series data.

Figure 5:
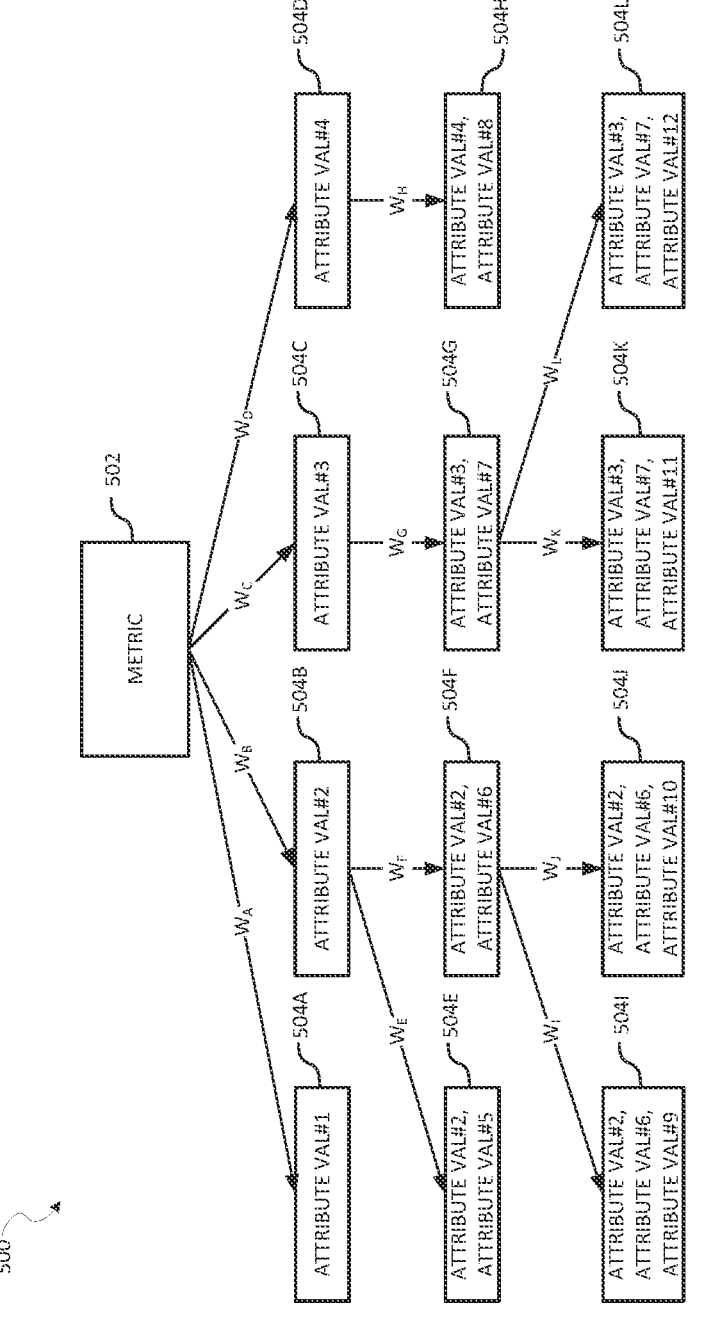
FIGS. 5 and 6 illustrate example graphs for determining candidate attribute value sets of a time series of measurement values of a metric, according to some example embodiments.
Figure 6:
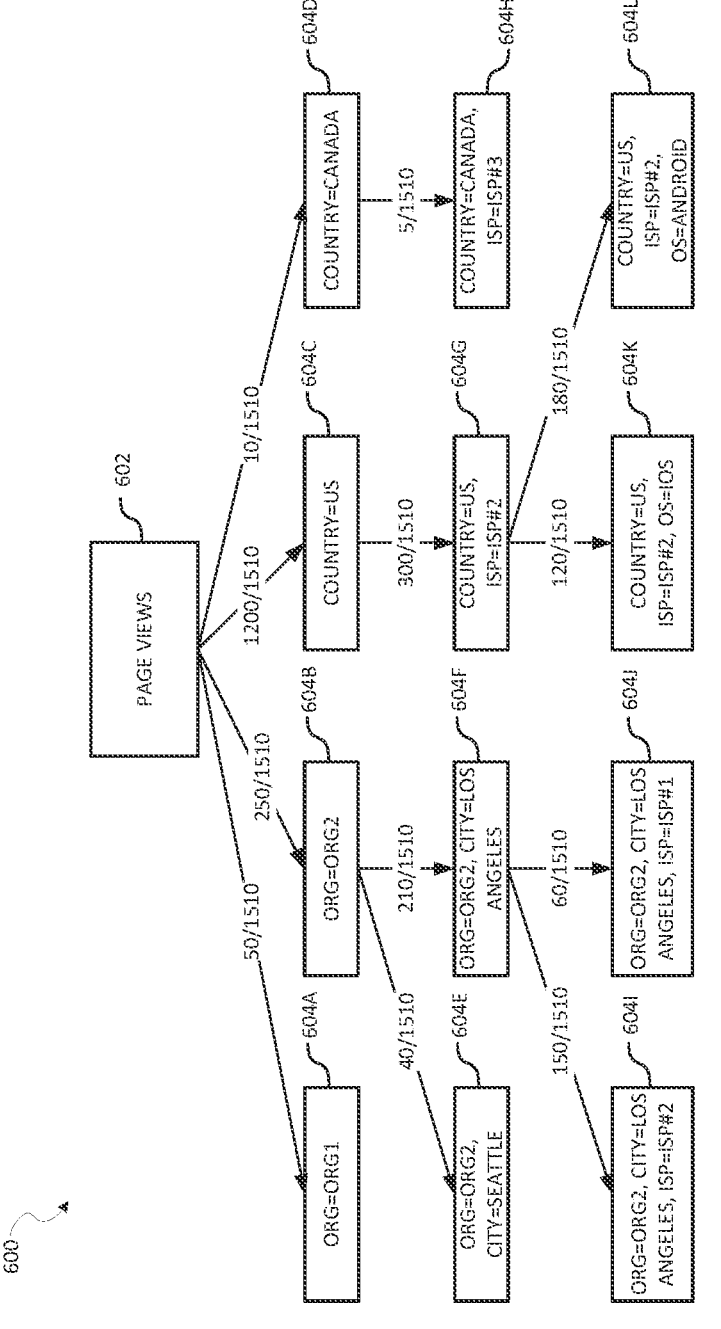

FIGS. 5 and 6 illustrate diagrams of example graphs 500, 600 for determining candidate attribute value sets of a time series of measurement values of a metric, according to some example embodiments. According to various embodiments, a graph similar to graphs 500, 600 can be used by a graph-based process to determine candidate attribute value sets for anomaly alert monitoring of a metric based on sets of attribute values associated with a time series of measurement values. Though various embodiments can use different kinds of graphs in determining candidate attribute value sets, each of graphs 500, 600 is organized as a tree that comprises a root node representing all measurement values of a metric, and a plurality of child nodes connected to the root node, where each child node represents a set of measurement values from the time series associated with a different attribute value set.

Referring now to FIG. 5, the graph 500 relates to a non-specific metric, where root node 502 represents all measurement values in a time series for the non-specific metric (e.g., measurement values associated with all attribute values), and a plurality of child nodes 504A through 504L (collectively referred to herein as children nodes 504) that each represents a different set of measurement values from the time series (e.g., different subset of all measurement values in the time series) that is associated with a different set of attribute values. As shown, each connection in the graph 500 from a parent node to a child node has a weight (or score) W (e.g., connection from root node 502 to child node 504A has a weight $W_A$, connection from root node 502 to child node 504B has a weight $W_B$, connection from root node 502 to child node 504C has a weight $W_C$, connection from root node 502 to child node 504D has a weight $W_D$, connection from child node 50413 to child node 504E has a weight $W_E$, connection from child node 504B to child node 504F has a weight $W_F$, and so on).

For some embodiments, a weight of a connection from a parent node to a child node is determined based on a total count of measurement values in the time series and an individual count of measurement values in the time series based on a set of attribute values associated with the child node. For instance, the weight $W_G$ of a connection from the child node 504C to child node 504G is determined based on a total count of measurement values in the time series (associated with root node 502) and an individual count of measurement values in the time series associated with attribute value #3 and attribute value #7 of child node 504G. As another example, the weight $W_K$ of a connection from the child node 504G to child node 504K is determined based on a total count of measurement values in the time series (associated with root node 502) and an individual count of measurement values in the time series associated with attribute value #3, attribute value #7, and attribute value #11 of child node 504K. For some embodiments, during execution of a graph-based process as described herein, the graph 500 is traversed based on the weights of the connections to determine (e.g., identify) one or more of the children nodes 504 of interest, and a set of attribute values of each of the determined (e.g., identified) children nodes 504 is regarded as a candidate attribute value sets.

Referring now to FIG. 6, the graph 600 is similar to the graph 500 and relates specifically to a metric of page views of a website. Accordingly, root node 602 represents all measurement values in a time series for the page views, and a plurality of child nodes 604A through 604L (collectively referred to herein as children nodes 604) that each represents a different set of measurement values from the time series (e.g., different subset of all measurement values in the time series) that is associated with a different set of attribute values. For instance, root node 602 represents all measurement values from the time series (comprising a total of 1,510,000 measurement values), child node 604A represents 50 k measurement values from the time series associated with an organization (ORG) attribute having an attribute value of organization 1 (ORG1), child node 604B represents 250 k measurement values from the time series associated with an organization (ORG) attribute having an attribute value of organization 2 (ORG2), child node 604C represents 1,200,000 measurement values from the time series associated with a country attribute having an attribute value of United States (US), child node 604D represents 10 k measurement values from the time series associated with a country attribute having an attribute value of Canada, and so on. As shown, each connection in the graph 600 from a parent node to a child node has a weight (or score) W (e.g., connection from root node 602 to child node 604A has a weight of 50 divided by 1510, connection from root node 602 to child node 604B has a weight of 250 divided by 1510, connection from root node 602 to child node 604C has a weight of 1200 divided by 1510, connection from root node 602 to child node 604D has a weight of 10 divided by 1510, connection from child node 60413 to child node 604E has a weight of 40 divided by 1510, connection from child node 604B to child node 604F has a weight of 210 divided by 1510, and so on).

For some embodiments, a weight of a connection from a parent node to a child node is determined based on a total count of measurement values (1,510,000 measurement values) in the time series and an individual count of measurement values in the time series based on a set of attribute values associated with the child node. For instance, the weight of a connection from the child node 604C to child node 604G is determined based on 1,510,000 measurement values in the time series (associated with root node 602) and 300 k measurement values in the time series associated with attribute value #3 and attribute value #7 of child node 604G. As another example, the weight of a connection from the child node 604G to child node 604K is determined based on 1,510,000 measurement values in the time series (associated with root node 602) and 120 k measurement values in the time series associated with attribute value #3, attribute value #7, and attribute value #11 of child node 604K. For some embodiments, during execution of a graph-based process as described herein, the graph 600 is traversed based on the weights of the connections to determine (e.g., identify) one or more of the children nodes 604 of interest, and a set of attribute values of each of the determined (e.g., identified)

children nodes 604 is regarded as a candidate attribute value set. For example, if the count threshold is set for 200 k for the graph-based process, each set of attribute values associated with one of child nodes 604B, 604C, 604F, and 604G can be selected as a candidate attribute value set.

FIGS. 7 through 13 illustrate example graphical user interfaces (GUIs) for alert monitoring of metric data based on one or more recommended attribute values, according to various embodiments of the present disclosure.

Figure 7:
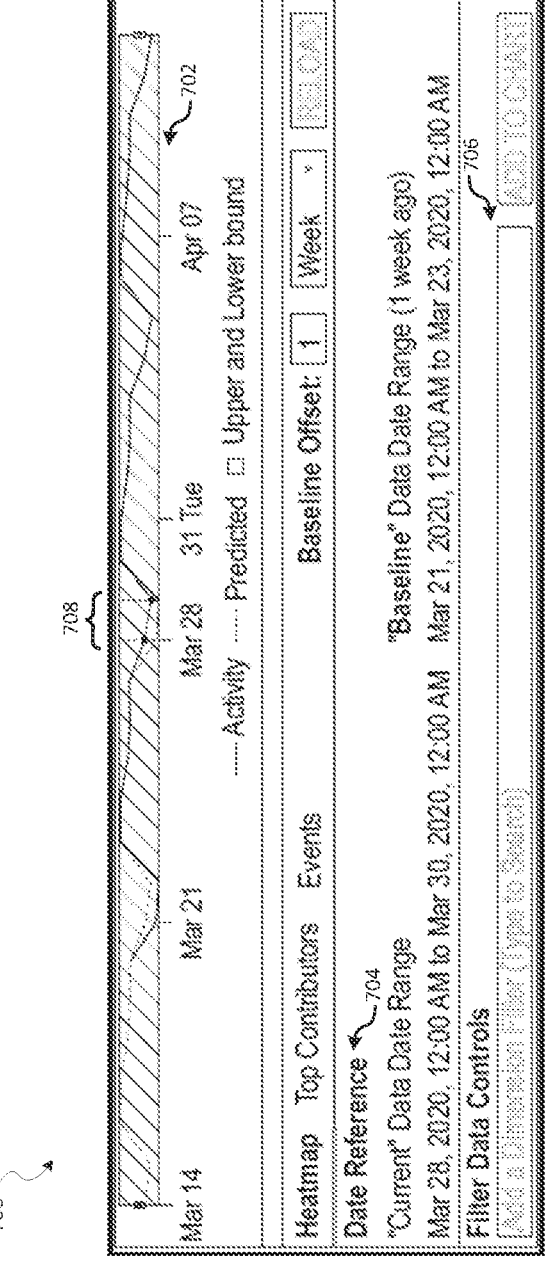

Referring now to FIG. 7, a user interface 700 represents a GUI presenting a graphical representation 702 (e.g., graph) of at least a portion of a time series of measurement values over a specified data range, where the graphical representation 702 includes one or more anomalies 708 detected by a set of trained models. The graphical representation 702 illustrates a plot of actual (e.g., observed) measurement values in the tine series, another plot of predicted (e.g., expected) measurement values as described by a set of trained models, where the predicted (e.g., expected) measurement values can be used to detect the anomalies 708 as described herein. A data reference section 704 of the user interface 700 indicates the specified data range of the detected anomalies, and the data range of baseline data used to detect the anomalies. A user can use a filter data control field 706 of the user interface 700 to add one or more attribute values (e.g., dimension values) as a search filter to add to the graphical representation 702.

Figure 8:
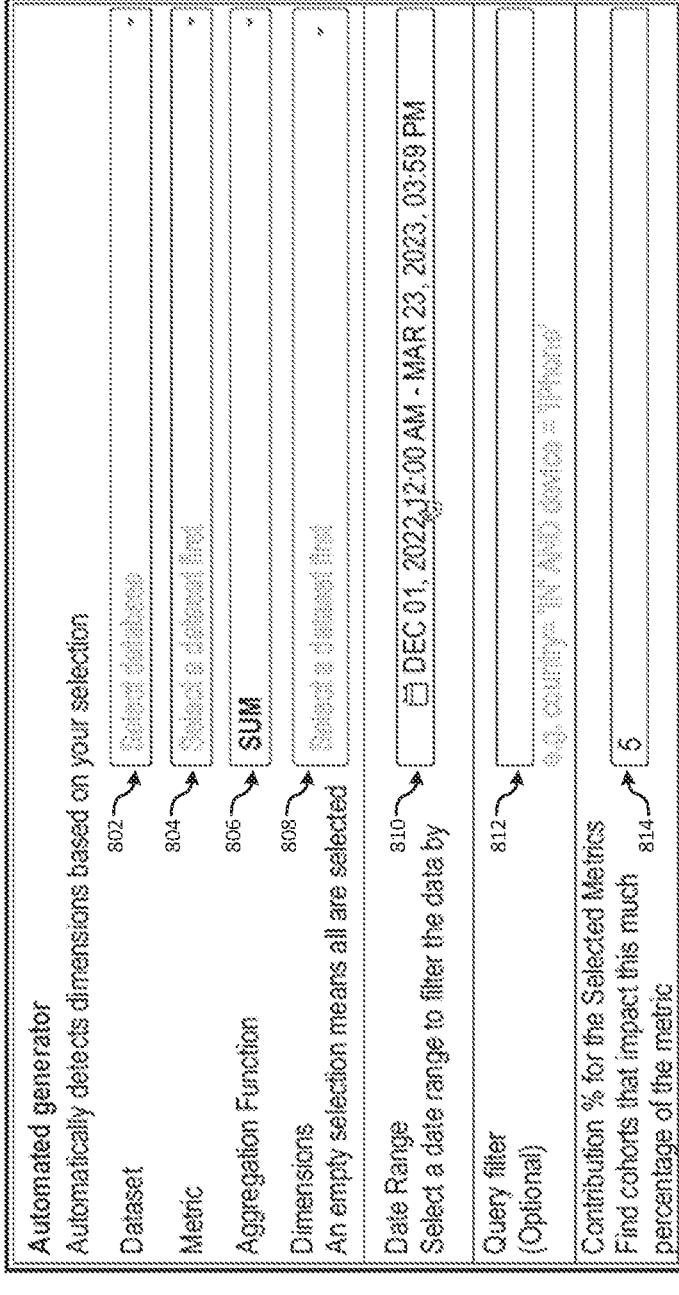

Referring now to FIG. 8, a user interface 800 represents a GUI that a user can use to determine (e.g., automatically determine or generate) one or more candidate attribute value sets (e.g., recommended attribute values) to monitor measurement values in a time series for alert monitoring. In particular, a user can use user interface 800 to specify a dataset 802 (e.g., a database or a data source), select metric 804 (e.g., a time series of measurement values for the metric) from the dataset, select an aggregation function 806 (e.g., SUM, COUNT, MAX, MIN, or AVG function) to be applied to the measurement values to detect anomalies using a set of trained models, and specify one or more dimensions 808 (e.g., attributes, such as country=India, device_type=mobile) to filter one or more candidate attribute value sets for the alert monitoring. A user can further use a date range 810 of the user interface 800 to specify a date range to filter the time series of measurement values prior to determining one or more recommended attribute values for the alert monitoring. A user can further use a query filter field 812 of the user interface 800 to specify a query filter (e.g., SQL statement including WHEREIN and HAVING clauses) to filter the time series of measurement values prior to determining one or more recommended attribute values for the alert monitoring. Additionally, a user can use a contribution field 814 to specify a contribution value (e.g., percentage) for finding candidate attribute value sets. For instance, a user can use the contribution field 814 to set a threshold weight (e.g., 5%) to ensure that candidate attribute value sets are determined (e.g., identified) based on attribute values associated with measurement values that make up the remainder of the time series (e.g., measurement values in the time series associated with a candidate attribute value set make up more than 5% of the measurement values in the time series).

Referring now to FIG. 9, a user interface 900 represents a GUI that presents one or more candidate attribute value sets determined by various embodiments described herein (e.g., using a graph-based process). For instance, the user interface 900 can be presented on a display to a user in response to the user using the user interface 800 of FIG. 8 to determine the one or more candidate attribute value sets. The user interface 900 presents each individual candidate attribute value set with a name 902, an individual contribution 904 (e.g., count of) of measurement values in the time series associated with (e.g., matching) attributes values of the individual candidate attribute value set, and a total impact 906 (e.g., weight or weighted score) of measurement values in the time series determined based on the individual contribution 904 of the individual candidate attribute value set. For instance, the first candidate attribute value set shown in the user interface 900 has a name of "country='US' and device='phone'," which describes attribute values in the first candidate attribute value set; an individual contribution (e.g., individual count) of 1.0 k measurement values in the time series associated with (e.g., matching with) attribute values in the first candidate attribute value set; and a total impact of 288.59% for the first candidate attribute value set based on the 1.0 k individual contribution to the time series by measurement values associated with (e.g., matching with) the first candidate attribute value set. Through the user interface 900, a user can select one or more of the candidate attribute value sets from the plurality of candidate attribute value sets presented in the user interface 900, and the user can select a button 908 to cause a configuration (e.g., creation or generation) of a single or a multi-attribute (e.g., dimension) alert monitoring using attribute values from each of the selected candidate attribute value sets.

Figure 10:
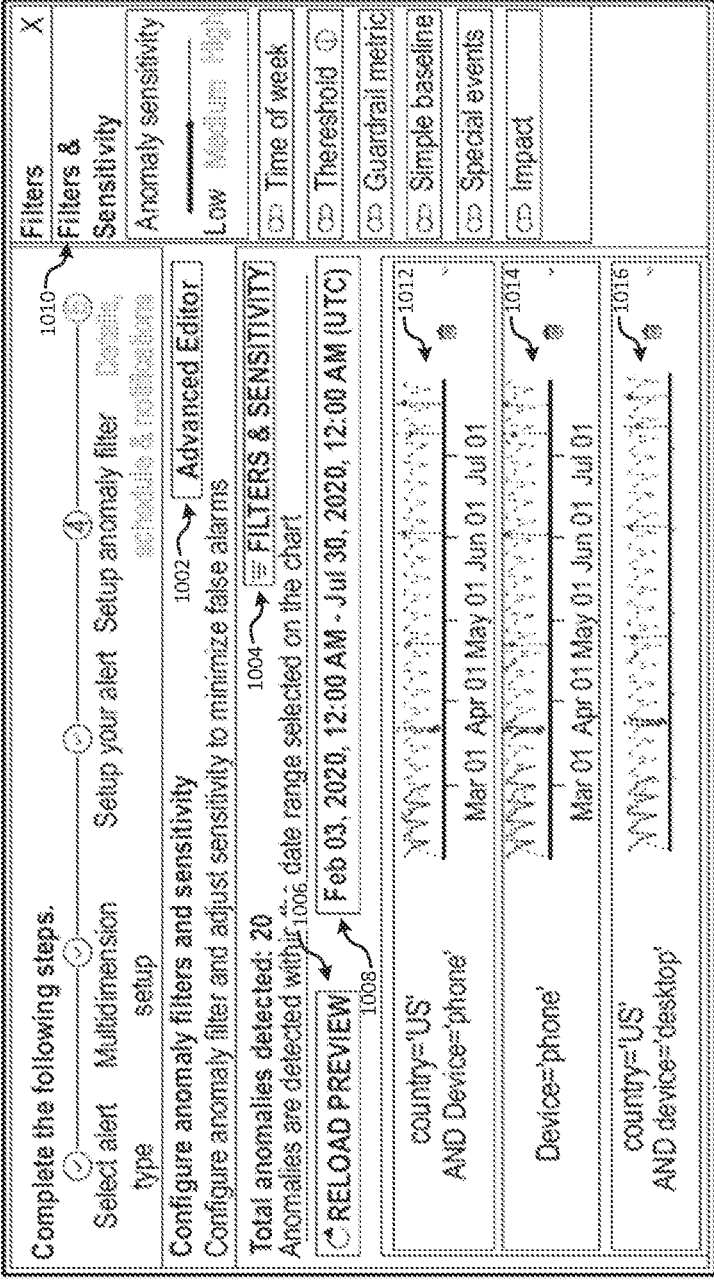

Referring now to FIG. 10, a user interface 1000 represents a GUI that enables a user to configure a filter used in detecting anomalies for alert monitoring. In particular, the user interface 1000 presents the user with one or more previews of anomaly detection performed for the alert monitoring based on candidate attribute value sets determined and selected (e.g., by the user). Through the user interface 1000, the user can access an advanced editor for the filter via a button 1002 of the user interface 1000, and the user can adjust a sensitivity (e.g., low, medium, high) or parameters of the filter (e.g., time of week, contribution or weight threshold, guardrail metric, baseline, special events, impacts) via a button 1004, which causes the display of a sidebar 1010. After the user has adjusted the filter (e.g., via the advanced editor or the sidebar 1010), the user can select a button 1006 to cause the anomaly preview to reload for the user's review. Additionally, the user can use date range input 1008 to adjust a date range for previewing the anomalies. For each selected candidate attribute value set, a preview of anomalies detected (based on settings of the filter) is presented in the user interface 1000, as illustrated by previews 1012, 1014, 1016.

Figure 11:
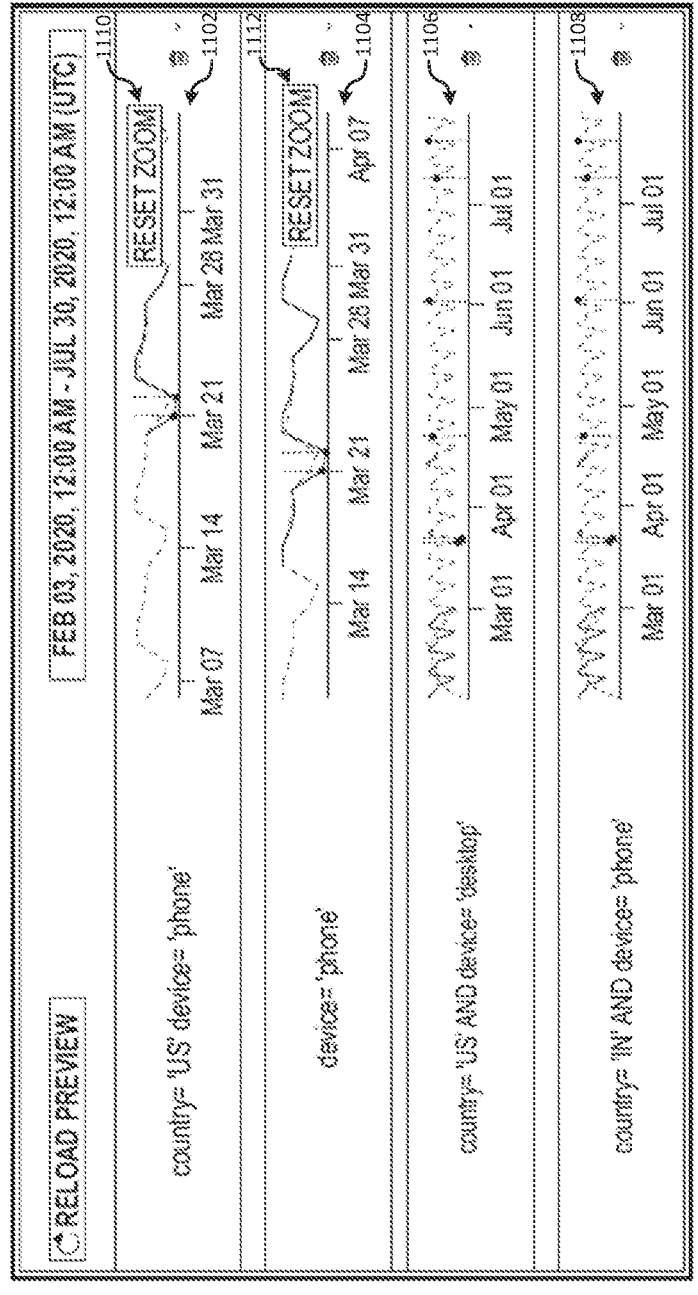

Referring now to FIG. 11, a user interface 1100 represents a GUI that illustrates how a user can investigate and zoom into previews of detected anomalies based on different candidate attribute value sets, as shown by previews 1102, 1104, 1106, and 1108. As shown, after the user has zoomed into the graphical representations of the time series of the previews 1102 and 1104 to investigate detected anomalies, the user can select buttons 1110, 1112 to respectively reset the zooms.

Figure 12:
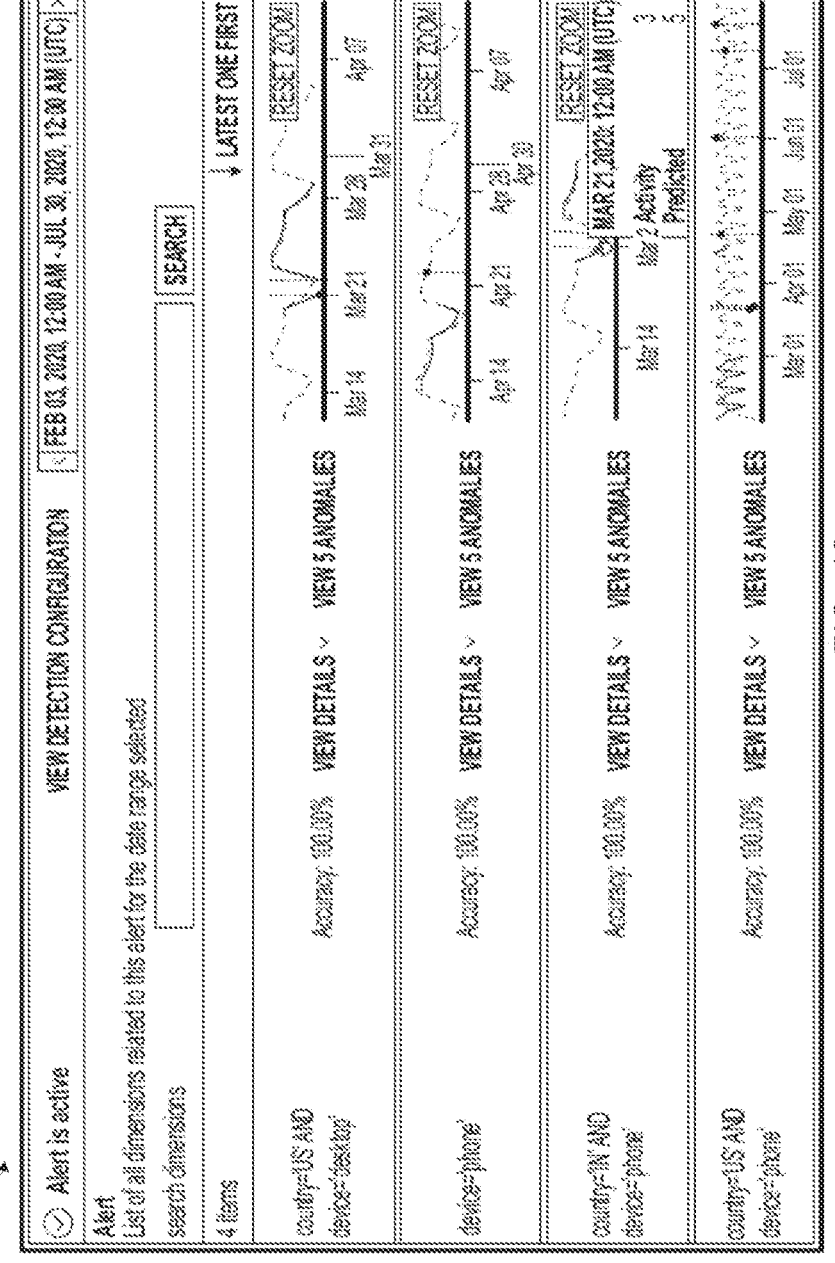

Referring now to FIG. 12, a user interface 1200 represents a GUI providing a summary of anomalies detected in a time series of measurement values by different alert monitors based on different attribute value sets (after those different alert monitors have been configured and enabled). As shown, the summary of each alert monitor can indicate a number of anomalies detected and a graphical representation of a time series with one or more anomalies detected in association with the alert monitor. For example, for an alert monitor associated with an attribute value set comprising "country='US' and device='desktop'," 5 anomalies are detected once the alert is enabled.

Figure 13:
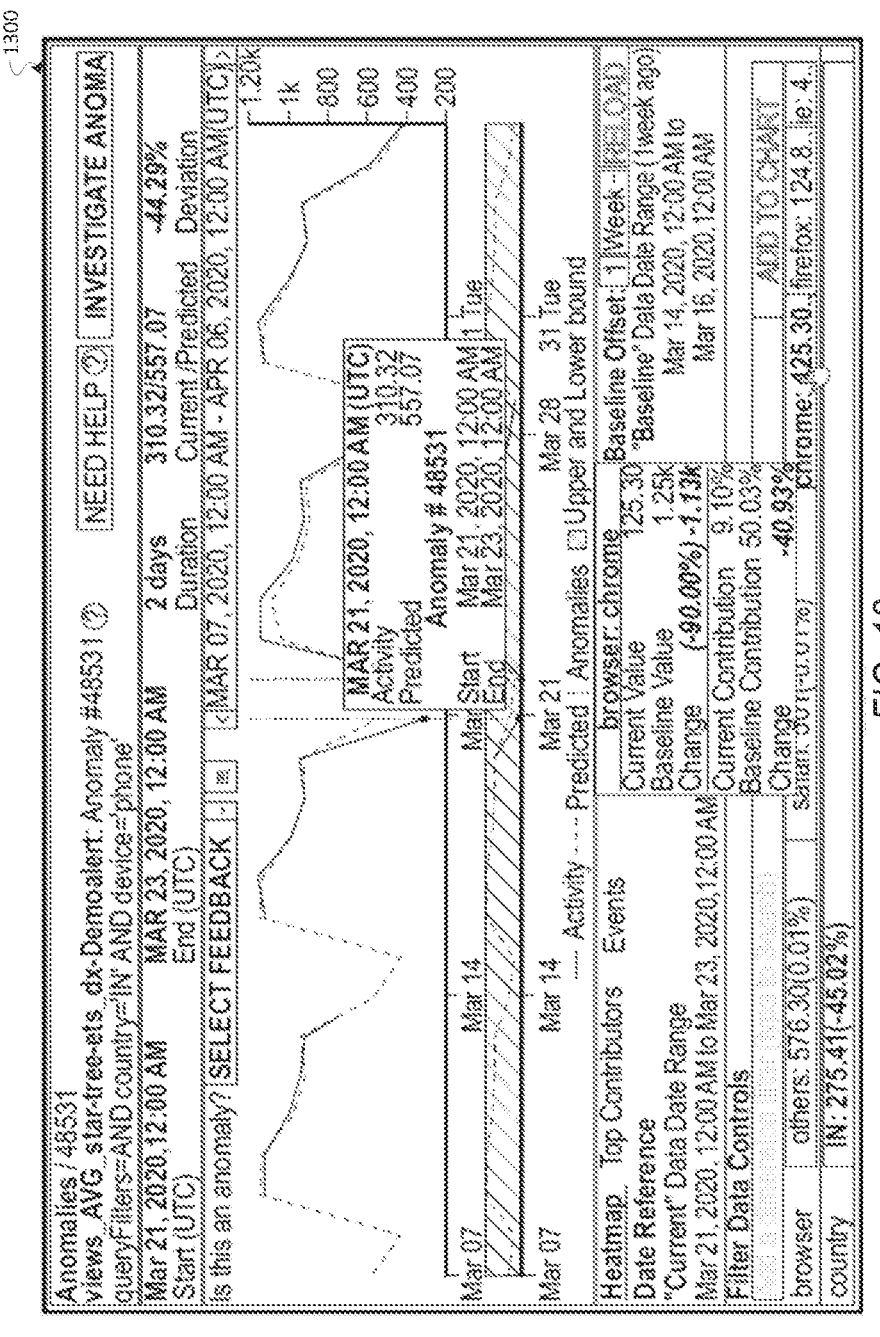

Referring now to FIG. 13, a user interface 1300 represents a GUI that a user can use to perform root cause analysis on a specific anomaly detected in connection with an alert generated (e.g., triggered) by an alert monitor, which can be configured using a candidate attribute value set as described herein.

Figure 14:
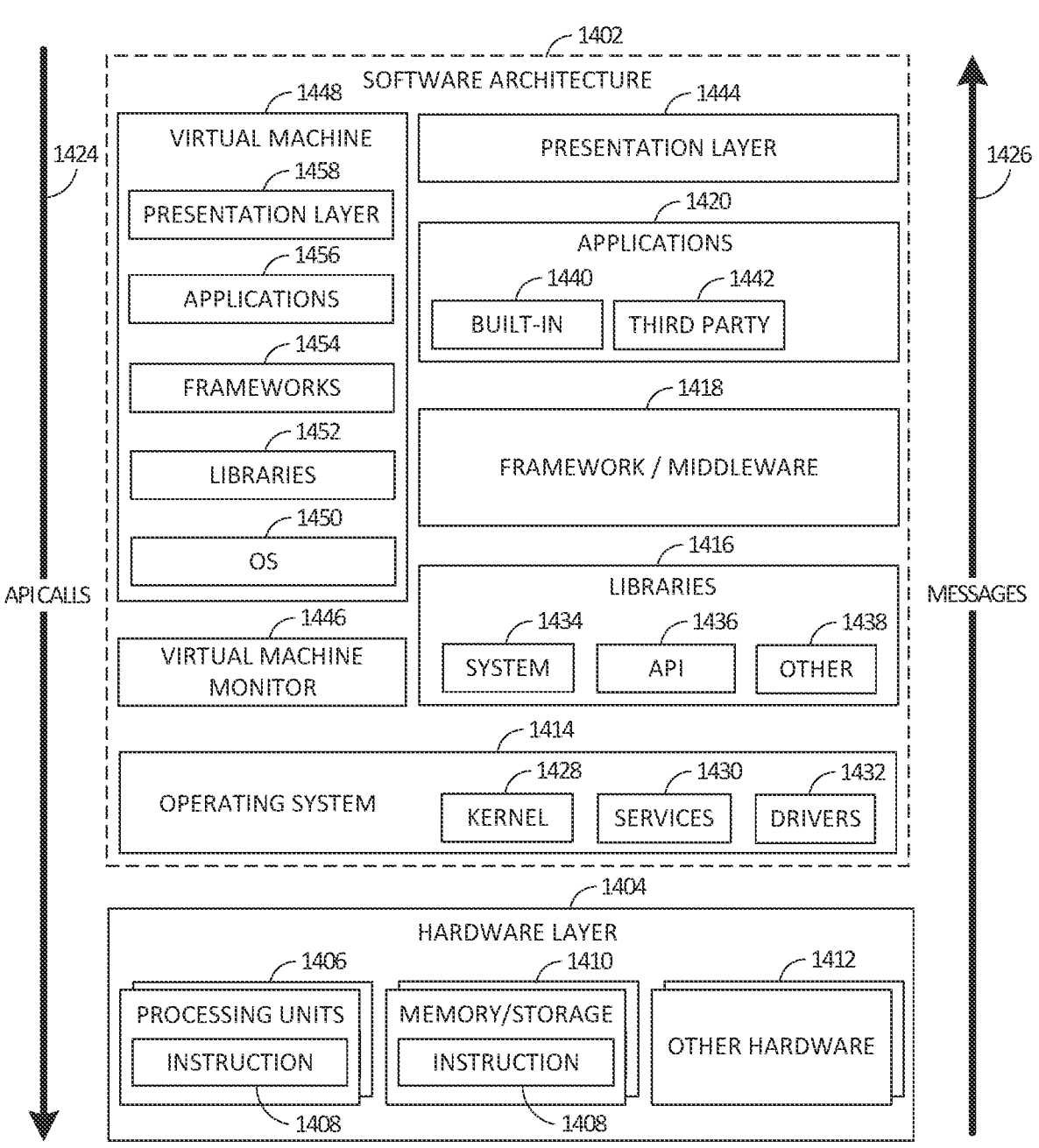
FIG. 14 is a block diagram illustrating a representative software architecture, which may be used in conjunction with various hardware architectures herein described, according to various embodiments of the present disclosure.
Figure 15:
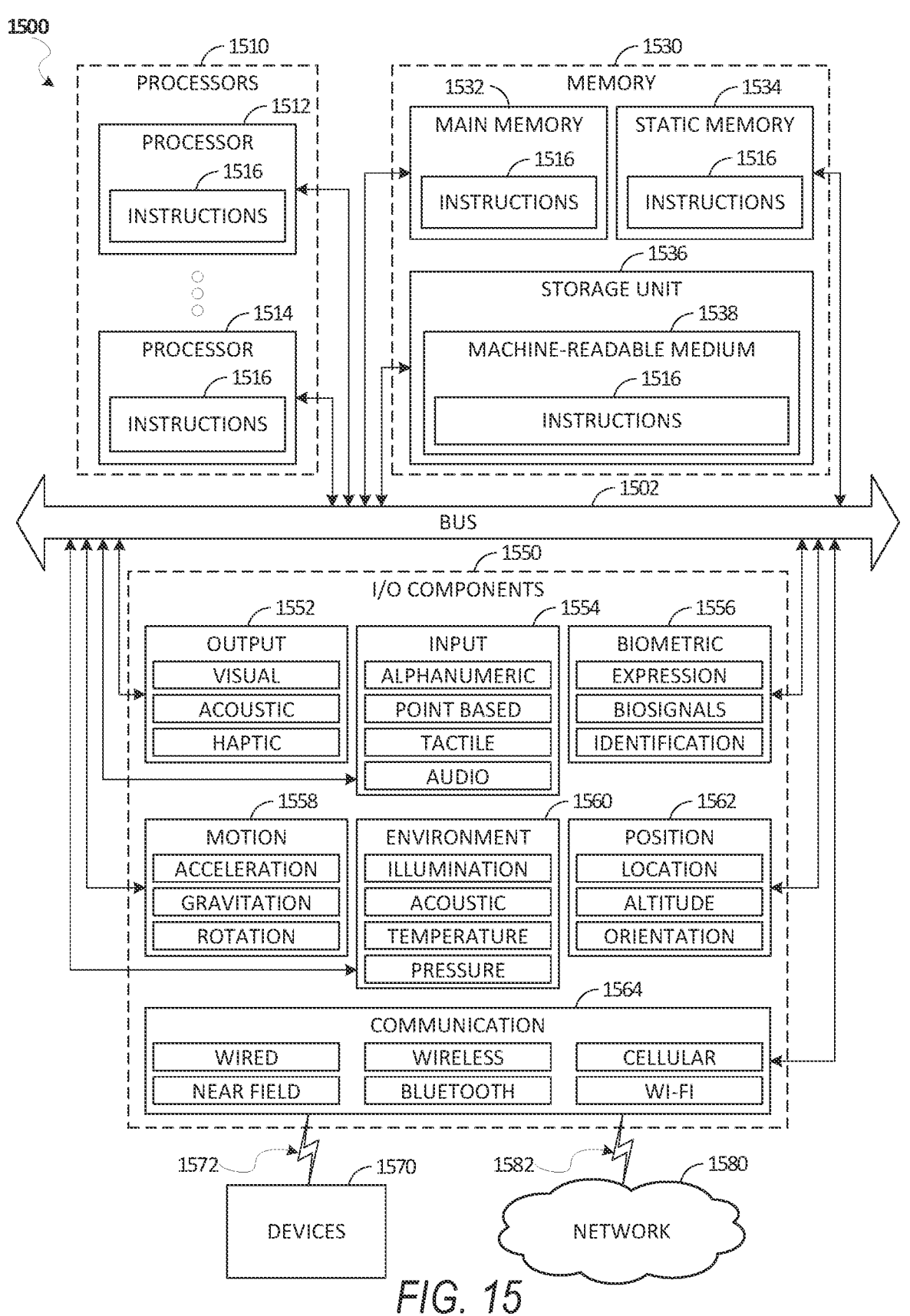
FIG. 15 is a block diagram illustrating components of a machine able to read instructions from a machine storage medium and perform any one or more of the methodologies discussed herein according to various embodiments of the present disclosure.

Various embodiments described herein may be implemented by way of the example software architecture illustrated by and described with respect to FIG. 14 or by way of the example machine illustrated by and described with respect to FIG. 15.

FIG. 14 is a block diagram illustrating an example of a software architecture 1402 that may be installed on a machine, according to some example embodiments. FIG. 14 is merely a non-limiting example of a software architecture, and it will be appreciated that many other architectures may be implemented to facilitate the functionality described herein. The software architecture 1402 may be executing on hardware such as a machine 1500 of FIG. 15 that includes, among other things, processors 1510, memory 1530, and input/output (1IO) components 1550. A representative hardware layer 1404 is illustrated and can represent, for example, the machine 1500 of FIG. 15. The representative hardware layer 1404 comprises one or more processing units 1406 having associated executable instructions 1408. The executable instructions 1408 represent the executable instructions of the software architecture 1402. The hardware layer 1404 also includes memory or storage modules 1410, which also have the executable instructions 1408. The hardware layer 1404 may also comprise other hardware 1412, which represents any other hardware of the hardware layer 1404, such as the other hardware illustrated as part of the machine 1500.

In the example architecture of FIG. 14, the software architecture 1402 may be conceptualized as a stack of layers, where each layer provides particular functionality. For example, the software architecture 1402 may include layers such as an operating system 1414, libraries 1416, frameworks/middleware 1418, applications 1420, and a presentation layer 1444. Operationally, the applications 1420 or other components within the layers may invoke API calls 1424 through the software stack and receive a response, returned values, and so forth (illustrated as messages 1426) in response to the API calls 1424. The layers illustrated are representative in nature, and not all software architectures have all layers. For example, some mobile or special-purpose operating systems may not provide a frameworks/middleware 1418 layer, while others may provide such a layer. Other software architectures may include additional or different layers.

The operating system 1414 may manage hardware resources and provide common services. The operating system 1414 may include, for example, a kernel 1428, services 1430, and drivers 1432. The kernel 1428 may act as an abstraction layer between the hardware and the other software layers. For example, the kernel 1428 may be responsible for memory management, processor management (e.g., scheduling), component management, networking, security settings, and so on. The services 1430 may provide other common services for the other software layers. The drivers 1432 may be responsible for controlling or interfacing with the underlying hardware. For instance, the drivers 1432 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1416 may provide a common infrastructure that may be utilized by the applications 1420 and/or other components and/or layers. The libraries 1416 typically provide functionality that allows other software modules to perform tasks in an easier fashion than by interfacing directly with the underlying operating system 1414 functionality (e.g., kernel 1428, services 1430, or drivers 1432). The libraries 1416 may include system libraries 1434 (e.g., C standard library) that may provide functions such as memory allocation functions, string manipulation functions, mathematical functions, and the like. In addition, the libraries 1416 may include API libraries 1436 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1416 may also include a wide variety of other libraries 1438 to provide many other APIs to the applications 1420 and other software components/modules.

The frameworks/middleware 1418 (also sometimes referred to as middleware) may provide a higher-level common infrastructure that may be utilized by the applications 1420 or other software components/modules. For example, the frameworks/middleware 1418 may provide various graphical user interface functions, high-level resource management, high-level location services, and so forth. The frameworks/middleware 1418 may provide a broad spectrum of other APIs that may be utilized by the applications 1420 and/or other software components/modules, some of which may be specific to a particular operating system or platform.

The applications 1420 include built-in applications 1440 and/or third-party applications 1442. Examples of representative built-in applications 1440 may include, but are not limited to, a home application, a contacts application, a browser application, a book reader application, a location application, a media application, a messaging application, or a game application.

The third-party applications 1442 may include any of the built-in applications 1440, as well as a broad assortment of other applications. In a specific example, the third-party applications 1442 (e.g., an application developed using the Android™ or iOS™ software development kit (SDK) by an entity other than the vendor of the particular platform) may be mobile software running on a mobile operating system such as IOS™, Android™, or other mobile operating systems. In this example, the third-party applications 1442 may invoke the API calls 1424 provided by the mobile operating system such as the operating system 1414 to facilitate functionality described herein.

The applications 1420 may utilize built-in operating system functions (e.g., kernel 1428, services 1430, or drivers 1432), libraries (e.g., system libraries 1434, API libraries 1436, and other libraries 1438), or frameworks/middleware 1418 to create user interfaces to interact with users of the system. Alternatively, or additionally, in some systems, interactions with a user may occur through a presentation layer, such as the presentation layer 1444. In these systems, the application/module "logic" can be separated from the aspects of the application/module that interact with the user.

Some software architectures utilize virtual machines. In the example of FIG. 14, this is illustrated by a virtual machine 1448. The virtual machine 1448 creates a software environment where applications/modules can execute as if they were executing on a hardware machine (e.g., the machine 1500 of FIG. 15). The virtual machine 1448 is hosted by a host operating system (e.g., the operating system 1414) and typically, although not always, has a virtual machine monitor 1446, which manages the operation of the virtual machine 1448 as well as the interface with the host operating system (e.g., the operating system 1414). A software architecture executes within the virtual machine 1448, such as an operating system 1450, libraries 1452, frameworks/middleware 1454, applications 1456, or a presentation layer 1458. These layers of software architecture executing within the virtual machine 1448 can be the same as corresponding layers previously described or may be different.

FIG. 15 illustrates a diagrammatic representation of a machine 1500 in the form of a computer system within which a set of instructions may be executed for causing the machine 1500 to perform any one or more of the methodologies discussed herein, according to an embodiment. Specifically, FIG. 15 shows a diagrammatic representation of the machine 1500 in the example form of a computer system, within which instructions 1516 (e.g. software, a program, an application, an applet, an app, or other executable code) for causing the machine 1500 to perform any one or more of the methodologies discussed herein may be executed. For example, the instructions 1516 may cause the machine 1500 to execute the method 400 described above with respect to FIG. 4. The instructions 1516 transform the general, non-programmed machine 1500 into a particular machine 1500 programmed to carry out the described and illustrated functions in the manner described. In alternative embodiments, the machine 1500 operates as a standalone device or may be coupled (e.g., networked) to other machines. In a networked deployment, the machine 1500 may operate in the capacity of a server machine or a client machine in a server-client network environment, or as a peer machine in a peer-to-peer (or distributed) network environment. The machine 1500 may comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, or any machine capable of executing the instructions 1516, sequentially or otherwise, that specify actions to be taken by the machine 1500. Further, while only a single machine 1500 is illustrated, the term "machine" shall also be taken to include a collection of machines 1500 that individually or jointly execute the instructions 1516 to perform any one or more of the methodologies discussed herein.

The machine 1500 may include processors 1510, memory 1530, and I/O components 1550, which may be configured to communicate with each other such as via a bus 1502. In an embodiment, the processors 1510 (e.g., a hardware processor, such as a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1512 and a processor 1514 that may execute the instructions 1516. The term "processor" is intended to include multi-core processors that may comprise two or more independent processors (sometimes referred to as "cores") that may execute instructions contemporaneously. Although FIG. 15 shows multiple processors 1510, the machine 1500 may include a single processor with a single core, a single processor with multiple cores (e.g., a multi-core processor), multiple processors with a single core, multiple processors with multiple cores, or any combination thereof.

The memory 1530 may include a main memory 1532, a static memory 1534, and a storage unit 1536 including machine-readable medium 1538, each accessible to the processors 1510 such as via the bus 1502. The main memory 1532, the static memory 1534, and the storage unit 1536 store the instructions 1516 embodying any one or more of the methodologies or functions described herein. The instructions 1516 may also reside, completely or partially, within the main memory 1532, within the static memory 1534, within the storage unit 1536, within at least one of the processors 1510 (e.g., within the processor's cache memory), or any suitable combination thereof, during execution thereof by the machine 1500.

The I/O components 1550 may include a wide variety of components to receive input, provide output, produce output, transmit information, exchange information, capture measurements, and so on. The specific I/O components 1550 that are included in a particular machine will depend on the type of machine. For example, portable machines such as mobile phones will likely include a touch input device or other such input mechanisms, while a headless server machine will likely not include such a touch input device. It will be appreciated that the 110 components 1550 may include many other components that are not shown in FIG. 15. The I/O components 1550 are grouped according to functionality merely for simplifying the following discussion, and the grouping is in no way limiting. In various embodiments, the I/O components 1550 may include output components 1552 and input components 1554. The output components 1552 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1554 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further embodiments, the P/O components 1550 may include biometric components 1556, motion components 1558, environmental components 1560, or position components 1562, among a wide array of other components. The motion components 1558 may include acceleration sensor components (e.g., accelerometer), gravitation sensor components, rotation sensor components (e.g., gyroscope), and so forth. The environmental components 1560 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gasses for safety or to measure pollutants in the atmosphere), or other components that may provide indications, measurements, or signals corresponding to a surrounding physical environment. The position components 1562 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1550 may include communication components 1564 operable to couple the machine 1500 to a network 1580 or devices 1570 via a coupling 1582 and a coupling 1572, respectively. For example, the communication components 1564 may include a network interface component or another suitable device to interface with the network 1580. In further examples, the communication components 1564 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1570 may be another machine or any of a wide variety of peripheral devices (e.g., a peripheral device coupled via a USB).

Moreover, the communication components 1564 may detect identifiers or include components operable to detect identifiers. For example, the communication components 1564 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1564, such as location via Internet Protocol (IP) geolocation, location via Wi-Fi® signal triangulation, location via detecting an NEC beacon signal that may indicate a particular location, and so forth.

Certain embodiments are described herein as including logic or a number of components, modules, elements, or mechanisms. Such modules can constitute either software modules (e.g., code embodied on a machine-readable medium or in a transmission signal) or hardware modules. A "hardware module" is a tangible unit capable of performing certain operations and can be configured or arranged in a certain physical manner. In various example embodiments, one or more computer systems (e.g., a standalone computer system, a client computer system, or a server computer system) or one or more hardware modules of a computer system (e.g., a processor or a group of processors) are configured by software (e.g., an application or application portion) as a hardware module that operates to perform certain operations as described herein.

In some embodiments, a hardware module is implemented mechanically, electronically, or any suitable combination thereof. For example, a hardware module can include dedicated circuitry or logic that is permanently configured to perform certain operations. For example, a hardware module can be a special-purpose processor, such as a field-programmable gate array (FPGA) or an ASIC. A hardware module may also include programmable logic or circuitry that is temporarily configured by software to perform certain operations. For example, a hardware module can include software encompassed within a general-purpose processor or other programmable processor. It will be appreciated that the decision to implement a hardware module mechanically, in dedicated and permanently configured circuitry, or in temporarily configured circuitry (e.g., configured by software) can be driven by cost and time considerations.

Accordingly, the phrase "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software can accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between or among such hardware modules may be achieved, for example, through the storage and retrieval of information in memory structures to which the multiple hardware modules have access. For example, one hardware module performs an operation and stores the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines 1500 including processors 1510), with these operations being accessible via a network (e.g., the Internet) and via one or more appropriate interfaces (e.g., an API). In certain embodiments, for example, a client device may relay or operate in communication with cloud computing systems, and may access circuit design information in a cloud environment.

The performance of certain of the operations may be distributed among the processors, not only residing within a single machine 1500, but deployed across a number of machines 1500. In some example embodiments, the processors 1510 or processor-implemented modules are located in a single geographic location (e.g., within a home environment, an office environment, or a server farm). In other example embodiments, the processors or processor-implemented modules are distributed across a number of geographic locations.

Executable Instructions and Machine Storage Medium

The various memories (i.e., 1530, 1532, 1534, and/or the memory of the processor(s) 1510) and/or the storage unit 1536 may store one or more sets of instructions 1516 and data structures (e.g., software) embodying or utilized by any one or more of the methodologies or functions described herein. These instructions (e.g., the instructions 1516), when executed by the processor(s) 1510, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions 1516 and/or data. The terms shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various embodiments, one or more portions of the network 1580 may be an ad hoc network, an intranet, an extranet, a virtual private network (VPN), a LAN, a wireless LAN (WLAN), a WAN, a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1580 or a portion of the network 1580 may include a wireless or cellular network, and the coupling 1582 may be a Code Division Multiple Access (CDMA) connection, a Global System for Mobile communications (GSM) connection, or another type of cellular or wireless coupling. In this example, the coupling 1582 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, fifth generation wireless (5G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions may be transmitted or received over the network using a transmission medium via a network interface device (e.g., a network interface component included in the communication components) and utilizing any one of a number of well-known transfer protocols (e.g., hypertext transfer protocol (HTTP)). Similarly, the instructions may be transmitted or received using a transmission medium via the coupling (e.g., a peer-to-peer coupling) to the devices 1570. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions for execution by the machine, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

EXAMPLES

Described implementations of the subject matter can include one or more features, alone or in combination as illustrated below by way of examples.

Example 1 is a system comprising: a memory storing instructions; and one or more hardware processors communicatively coupled to the memory and configured by the instructions to perform operations comprising: accessing current time series data that comprises a time series of measurement values for a metric over a period of time, the time series comprising a set of attribute values associated with each measurement value in the time series; performing a graph-based process on the time series of measurement values to determine a plurality of candidate attribute value sets for anomaly alert monitoring of the metric based on sets of attribute values associated with the time series of measurement values; selecting, from the plurality of candidate attribute value sets, a set of select attributes values based on at least one of user selection or automatic selection according to a set of criteria; configuring a new anomaly alert monitor based on the set of select attributes values; based on the new anomaly alert monitor, using a set of trained models to monitor new time series data for the metric based on the set of select attributes values and to detect whether any value anomalies exist in the new time series data; and causing an alert to be triggered, based on the new anomaly alert monitor, in response to detecting at least one value anomaly in the new time series data.

In Example 2, the subject matter of Example 1 where selecting the set of select attributes values based on the user selection comprises obtaining the user selection by causing at least a portion of the plurality of candidate attribute value sets to be presented on one or more displays.

In Example 3, the subject matter of Examples 1-2 where performing the graph-based process on the time series of measurement values to determine the plurality of candidate attribute value sets based on the sets of attribute values associated with the time series of measurement values comprises: generating a graph comprising nodes and weighted connections, the graph being generated using a total count of measurement values in the time series and using individual counts of measurement values in different portions of the time series associated with different attribute value sets; and traversing the graph to determine the plurality of candidate attribute value sets.

In Example 4, the subject matter of Examples 1-3 where performing the graph-based process on the time series of measurement values to determine the plurality of candidate attribute value sets based on the sets of attribute values associated with the time series of measurement values comprises: generating a graph comprising nodes and weighted connections, the graph being generated using a total count of measurement values in the time series and using individual counts of measurement values in different portions of the time series associated with different attribute value sets; and traversing the graph to determine the plurality of candidate attribute value sets with an associated weight for each of the plurality of candidate attribute value sets, the associated weight of an individual candidate attribute value set being determined based on one or more of the weighted connections of the graph.

In Example 5, the subject matter of Examples 1-4 where selecting the set of select attributes values based on the user selection comprises: obtaining the user selection by causing at least a portion of the plurality of candidate attribute value sets to be presented on one or more displays with respective weights.

In Example 6, the subject matter of Examples 1-5 where an individual weight of an individual weighted connection from a first node to a second node is determined based on the total count of measurement values and an individual count of measurement values in a portion of the time series that is associated with an individual attribute value set of the different attribute value sets, the second node being associated with the individual attribute value set.

In Example 7, the subject matter of Examples 1-6 where performing the graph-based process on the time series of measurement values to determine the plurality of candidate attribute value sets based on the sets of attribute values associated with the time series of measurement values comprises: generating a tree comprising: a root node associated with all measurement values in the time series; a plurality of children nodes, each child node of the plurality of children nodes being associated with a different attribute value set; and a plurality of connections, each connection of the plurality of connections from a parent node to a child node being associated with a weight determined based on an individual count of measurement values in a portion of the time series that is associated with an individual attribute value set associated with the child node; and traversing the tree to determine the plurality of candidate attribute value sets based on weights of one or more connections of the plurality of connections.

In Example 8, the subject matter of Examples 1-7 where performing the graph-based process on the time series of measurement values to determine the plurality of candidate attribute value sets is further based on a time window.

In Example 9, the subject matter of Examples 1-8 where performing the graph-based process on the time series of measurement values to determine the plurality of candidate attribute value sets is further based on a search depth.

In Example 10, the subject matter of Examples 1-9 where performing the graph-based process on the time series of measurement values to determine the plurality of candidate attribute value sets is further based on a threshold value.

In Example 11, the subject matter of Examples 1-10 where performing the graph-based process on the time series of measurement values to determine the plurality of candidate attribute value sets is further based on a database filter.

In Example 12, the subject matter of Examples 1-11 where performing the graph-based process on the time series of measurement values to determine the plurality of candidate attribute value sets is further based on a select set of attributes.

Example 13 is a non-transitory computer-readable medium comprising instructions that, when executed by a hardware processor of a device, cause the device to perform operations to implement any of Examples 1-12.

Example 14 is a method to implement any of Examples 1-12.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals. For instance, an embodiment described herein can be implemented using a non-transitory medium (e.g., a non-transitory computer-readable medium).

Throughout this specification, plural instances may implement resources, components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components.

As used herein, the term "or" may be construed in either an inclusive or exclusive sense. The terms "a" or "an" should be read as meaning "at least one," "one or more," or the like. The presence of broadening words and phrases such as "one or more," "at least" "but not limited to," or other like phrases in some instances shall not be read to mean that the narrower case is intended or required in instances where such broadening phrases may be absent. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. The specification and drawings are, accordingly, to be regarded in an illustrative rather than a restrictive sense.

It will be understood that changes and modifications may be made to the disclosed embodiments without departing from the scope of the present disclosure. These and other changes or modifications are intended to be included within the scope of the present disclosure.

What is claimed is:

1. A system comprising:

a memory storing instructions; and one or more hardware processors communicatively coupled to the memory and configured by the instructions to perform operations comprising:

accessing current time series data that comprises a time series of measurement values for a metric over a period of time, the time series comprising a set of attribute values associated with each measurement value in the time series;

performing a graph-based process on the time series of measurement values to determine a plurality of candidate attribute value sets for anomaly alert monitoring of the metric based on sets of attribute values associated with the time series of measurement values, the performing of the graph-based process comprising:

generating a tree that comprises:

a root node associated with all measurement values in the time series;

a plurality of children nodes, each child node of the plurality of children nodes being associated with a different attribute value set; and a plurality of connections, each connection of the plurality of connections from a parent node to a child node being associated with a weight determined based on:

an individual count of measurement values that are in a portion of the time series and that are associated with an individual attribute value set associated with the child node; and a total count of measurement values in the time series; and traversing the tree to determine the plurality of candidate attribute value sets based on weights of one or more connections of the plurality of connections;

selecting, from the plurality of candidate attribute value sets, a set of select attributes values based on at least one of user selection or automatic selection according to a set of criteria;

configuring a new anomaly alert monitor based on the set of select attributes values;

based on the new anomaly alert monitor, using a set of trained models to monitor new time series data for the metric based on the set of select attributes values and to detect whether any value anomalies exist in the new time series data; and causing an alert to be triggered, based on the new anomaly alert monitor, in response to detecting at least one value anomaly in the new time series data.

2. The system of claim 1, wherein the selecting of the set of select attributes values based on the user selection comprises:

obtaining the user selection by causing at least a portion of the plurality of candidate attribute value sets to be presented on one or more displays.

3. The system of claim 1, wherein the selecting of the set of select attributes values based on the user selection comprises:

obtaining the user selection by causing at least a portion of the plurality of candidate attribute value sets to be presented on one or more displays with respective weights.

4. The system of claim 1, wherein an individual weight of an individual weighted connection from a first node to a second node is determined based on the total count of measurement values and an individual count of measurement values that are in a portion of the time series and that are associated with an individual attribute value set of the different attribute value set, the second node being associated with the individual attribute value set.

5. The system of claim 1, wherein the weight is determined by dividing the individual count of measurement values by the total count of measurement values in the time series.

6. The system of claim 1, wherein the performing of the graph-based process on the time series of measurement values to determine the plurality of candidate attribute value sets is further based on a time window.

7. The system of claim 1, wherein the performing of the graph-based process on the time series of measurement values to determine the plurality of candidate attribute value sets is further based on a search depth.

8. The system of claim 1, wherein the performing of the graph-based process on the time series of measurement values to determine the plurality of candidate attribute value sets is further based on a threshold value.

9. The system of claim 1, wherein the performing of the graph-based process on the time series of measurement values to determine the plurality of candidate attribute value sets is further based on a database filter.

10. The system of claim 1, wherein the performing of the graph-based process on the time series of measurement values to determine the plurality of candidate attribute value sets is further based on a select set of attributes.

11. A non-transitory computer-readable medium comprising instructions that, when executed by a hardware processor of a device, cause the device to perform operations comprising:

accessing current time series data that comprises a time series of measurement values for a metric over a period of time, the time series comprising a set of attribute values associated with each measurement value in the time series;

performing a graph-based process on the time series of measurement values to determine a plurality of candidate attribute value sets for anomaly alert monitoring of the metric based on sets of attribute values associated with the time series of measurement values, the performing of the graph-based process comprising:

generating a tree that comprises:

a root node associated with all measurement values in the time series;

a plurality of children nodes, each child node of the plurality of children nodes being associated with a different attribute value set; and a plurality of connections, each connection of the plurality of connections from a parent node to a child node being associated with a weight determined based on:

an individual count of measurement values that are in a portion of the time series and that are associated with an individual attribute value set associated with the child node; and a total count of measurement values in the time series; and traversing the tree to determine the plurality of candidate attribute value sets based on weights of one or more connections of the plurality of connections;

selecting, from the plurality of candidate attribute value sets, a set of select attributes values based on at least one of user selection or automatic selection according to a set of criteria;

configuring a new anomaly alert monitor based on the set of select attributes values;

based on the new anomaly alert monitor, using a set of trained models to monitor new time series data for the metric based on the set of select attributes values and to detect whether any value anomalies exist in the new time series data; and causing an alert to be triggered, based on the new anomaly alert monitor, in response to detecting at least one value anomaly in the new time series data.

12. The non-transitory computer-readable medium of claim 11, wherein the selecting of the set of select attributes values based on the user selection comprises:

obtaining the user selection by causing at least a portion of the plurality of candidate attribute value sets to be presented on one or more displays.

13. The non-transitory computer-readable medium of claim 11, wherein the selecting of the set of select attributes values based on the user selection comprises:

obtaining the user selection by causing at least a portion of the plurality of candidate attribute value sets to be presented on one or more displays with respective weights.

14. The non-transitory computer-readable medium of claim 11, wherein an individual weight of an individual weighted connection from a first node to a second node is determined based on the total count of measurement values and an individual count of measurement values that are in a portion of the time series and that are associated with an individual attribute value set of the different attribute value set, the second node being associated with the individual attribute value set.

15. The non-transitory computer-readable medium of claim 11, wherein the weight is determined by dividing the individual count of measurement values by the total count of measurement values in the time series.

16. A method comprising:

accessing, by one or more hardware processors, current time series data that comprises a time series of measurement values for a metric over a period of time, the time series comprising a set of attribute values associated with each measurement value in the time series;

performing, by the one or more hardware processors, a graph-based process on the time series of measurement values to determine a plurality of candidate attribute value sets for anomaly alert monitoring of the metric based on sets of attribute values associated with the time series of measurement values, the performing of the graph-based process comprising:

generating a tree that comprises:

a root node associated with all measurement values in the time series;

a plurality of children nodes, each child node of the plurality of children nodes being associated with a different attribute value set; and a plurality of connections, each connection of the plurality of connections from a parent node to a child node being associated with a weight determined based on:

an individual count of measurement values that are in a portion of the time series and that are associated with an individual attribute value set associated with the child node; and a total count of measurement values in the time series; and traversing the tree to determine the plurality of candidate attribute value sets based on weights of one or more connections of the plurality of connections;

selecting, by the one or more hardware processors and from the plurality of candidate attribute value sets, a set of select attributes values based on at least one of user selection or automatic selection according to a set of criteria;

configuring, by the one or more hardware processors, a new anomaly alert monitor based on the set of select attributes values;

based on the new anomaly alert monitor, using a set of trained models by the one or more hardware processors to monitor new time series data for the metric based on the set of select attributes values and to detect whether any value anomalies exist in the new time series data; and causing, by the one or more hardware processors, an alert to be triggered in response to detecting at least one value anomaly in the new time series data.

17. The method of claim 16, wherein the selecting of the set of select attributes values based on the user selection comprises:

obtaining the user selection by causing at least a portion of the plurality of candidate attribute value sets to be presented on one or more displays.

18. The method of claim 16, wherein the selecting of the set of select attributes values based on the user selection comprises:

obtaining the user selection by causing at least a portion of the plurality of candidate attribute value sets to be presented on one or more displays with respective weights.

19. The method of claim 16, wherein an individual weight of an individual weighted connection from a first node to a second node is determined based on the total count of measurement values and an individual count of measurement values that are in a portion of the time series and that are associated with an individual attribute value set of the different attribute value set, the second node being associated with the individual attribute value set.

20. The method of claim 16, wherein the weight is determined by dividing the individual count of measurement values by the total count of measurement values in the time series.

\* \* \* \* \*